US012482165B2

(12) United States Patent
Pajot

(10) Patent No.: US 12,482,165 B2
(45) Date of Patent: Nov. 25, 2025

(54) METHOD OF AND SYSTEM FOR PERFORMING SIMULATION OF OBJECT-TO-OBJECT INTERACTION WITH A 3D AVATAR

(71) Applicant: Ultracine Studios Inc., Montreal (CA)

(72) Inventor: Nicolas Pajot, Montreal (CA)

(73) Assignee: Ultracine Studios Inc., Montreal (CA)

( * ) Notice: Subject to any disclaimer, the term of this patent is extended or adjusted under 35 U.S.C. 154(b) by 104 days.

(21) Appl. No.: 18/654,254

(22) Filed: May 3, 2024

(65) Prior Publication Data

US 2025/0342636 A1 Nov. 6, 2025

(51) Int. Cl.
  *G06T 13/00* (2011.01)
  *G06T 9/00* (2006.01)
  *G06T 13/40* (2011.01)
  *G06T 17/00* (2006.01)

(52) U.S. Cl.
  CPC .............. *G06T 13/40* (2013.01); *G06T 9/001* (2013.01); *G06T 17/00* (2013.01)

(58) Field of Classification Search
  CPC .......... G06T 13/40; G06T 9/001; G06T 17/00
  USPC ....................................................... 345/473
  See application file for complete search history.

(56) References Cited

U.S. PATENT DOCUMENTS 9,262,857 B2 * 2/2016 Sigal ..................... G06T 13/40
10,311,623 B2 * 6/2019 Zhou ..................... G06F 30/20

OTHER PUBLICATIONS

I. Zakharkin, K. Mazur, A. Grigorev and V. Lempitsky, "Point-Based Modeling of Human Clothing," 2021 IEEE/CVF International Conference on Computer Vision (ICCV), Montreal, QC, Canada, 2021, pp. 14698-14707, doi: 10.1109/ICCV48922.2021.01445. (Year: 2021).*

Chen et al., 2023. An Introduction to Point Cloud Compression Standards. GetMobile: Mobile Comp. and Comm. 27, 1 (Mar. 2023), 11-17. (Year: 2023).*

H. Zhang et al., "CloSET: Modeling Clothed Humans on Continuous Surface with Explicit Template Decomposition," 2023 IEEE/CVF Conference on Computer Vision and Pattern Recognition (CVPR), Vancouver, BC, Canada, 2023, pp. 501-511 (Year: 2023).*

* cited by examiner

*Primary Examiner* — Thomas J Lett
(74) *Attorney, Agent, or Firm* — Fasken Martineau Dumoulin LLP; Johann Gest

(57) ABSTRACT

There are provided methods, systems and non-transitory computer-readable mediums for performing simulations of object-to-object interaction in an animation of a 3D avatar. Compressed point clouds representing first and second objects individually animated with respect to the 3D avatar are received and decompressed, the first object being located on a layer below the second object. For each time frame, the first point cloud of the first object is projected onto the animation to obtain a projected point cloud. The projected point cloud is regrown towards the first point cloud and collisions with the second point cloud are detected to obtain a regrown point cloud. The regrown point cloud is solved using a set of constraints associated with the first object to obtain a final point cloud of the first object representing a frame of the first object interacting with the second object. The frame of the animation can then be rendered.

20 Claims, 16 Drawing Sheets

2000

```
receiving an indication of an animated body of a 3D avatar
2002
```
↓
```
receiving an indication of a first object to be animated in relation to
the body of the 3D avatar
2004
```
↓
```
receiving an indication of a second object to be animated in
relation to the body of the 3D avatar
2006
```
↓
```
generating, based on the indication of the animated body of the 3D
avatar and the indication of the first object, a first set of point
clouds
2008
```
↓
```
generating, based on the indication of the animated body of the 3D
avatar and the indication of the second object, a second set of
point clouds
2010
```
↓
```
compressing the first set of point clouds to obtain a compressed
first set of point clouds and the second set of point clouds to obtain
a compressed second set of point clouds
2012
```
↓
```
transmitting the first and compressed second set of cloud points
2014
```

| for each time frame, regrowing the respective projected point cloud to obtain a regrown point cloud, said regrowing comprising: 2116 |
|---|
| translating the given projected point in the respective first projected point cloud towards a corresponding given first point in the first point cloud 2118 |
| determining if the given translated projected point in the respective first projected point cloud intersects with the second point cloud 2120 |
| If it intersects, determining and storing an intersection point in the regrown point cloud 2122 / If it does not intersect, storing the corresponding given first point in the regrown point cloud 2124 | for each time frame, solving, using the set of constraints associated with the first object, the respective regrown point cloud to obtain a final point cloud 2126 for each time frame, rendering the final point cloud with a corresponding frame of the second point cloud and of the animation of the 3D avatar to obtain a respective frame of the final animation 2128

FIG. 22

METHOD OF AND SYSTEM FOR PERFORMING SIMULATION OF OBJECT-TO-OBJECT INTERACTION WITH A 3D AVATAR

CROSS-REFERENCE TO RELATED APPLICATIONS

None.ss

FIELD

The present technology relates to computer graphics in general and more specifically to methods, systems, and non-transitory computer-readable storage mediums for performing simulations of object-to-object interaction with a 3D avatar, where the objects may include soft body objects.

BACKGROUND

Avatars in virtual environments such as electronic video games are typically three-dimensional (3D) representations that vary widely in geometry and appearance. These avatars may embody diverse physical characteristics, including various body shapes (such as tall, short, muscular, or thin), genders, and even fantastical elements (such as non-human creatures). Additionally, avatars are often equipped with customizable features including an array of clothing and accessories, such as shirts, jackets, scarves, hats, and more.

As the demand for enhanced customization increases, particularly with avatars that feature non-standard body shapes or unique clothing requirements, the traditional methods prove inadequate, especially when simulating clothes worn by an avatar in movement is required.

Indeed, achieving realistic simulations of single objects, such as clothing on a moving 3D avatar, along with the interactions among multiple objects, such as various garments on an avatar's body, requires significant computational resources from client devices (e.g., mobile devices).

SUMMARY

It is an object of the present technology to ameliorate at least some of the inconveniences present in the prior art. One or more implementations of the present technology may provide and/or broaden the scope of approaches to and/or methods of achieving the aims and objects of the present technology.

Developers of the present technology have appreciated that realistic, physically accurate animation are the next frontier in game realism. However, there have been no breakthrough and there has been slow evolution compared to the evolution of graphical rendering technologies.

High quality physics simulation of soft bodies (e.g., clothes, accessories, hair) is extremely computing intensive, and a real-time simulation is impossible on current gaming devices, especially if multiple clothes are interacting. Further, current mobile devices are even more of a challenge because of their limited computational power.

One or more implementations of the present technology have been developed based on developers' appreciation that real-time animation of 3D avatars and objects including soft body objects such as clothes and hair is almost impossible on gaming device, especially if multiple soft body objects are interacting.

One or more implementations of the present technology have been developed based on developer's idea that offline pre-computation of arbitrarily complex physics states and compression of the data for distribution to rendering client devices could be performed using different data encoding methods independently from the type of the format and representations of the avatar and objects. Further, the compressed data could be streamed to client devices for rendering in real-time.

Developers have proposed that the rendering client devices could perform on-the-fly decompression of the physics states and frame-by-frame real-time animation, which requires minimal processing power. The physics states could be computed with any software solution and is not limited to soft body physics.

By using a simplified collision model and simplified constraint model during the simulation, object-to-object interaction with respect to the body of the 3D avatar could be computed performed in real-time, while also enabling artist-controlled fine-tuning.

Thus, one or more implementations of the present technology are directed to methods, systems and non-transitory computer-readable mediums for performing simulations of object-to-object interaction with a 3D avatar, where the objects may include soft body objects.

In accordance with a broad aspect of the present technology, there is provided a method for performing a simulation of interactions of objects in relation to a 3D avatar in real-time, the method being executed by at least one processor, the method comprising: during an online processing phase: receiving an animation of a body of a 3D avatar, the animation comprising a set of frames, each frame representing a respective position of the body of the 3D avatar in time, receiving a compressed first set of point clouds representing a first object animated in relation to the body of the 3D avatar, the compressed first set of point clouds having been generated and compressed offline, receiving a compressed second set of point clouds representing a second object animated in relation to the body of the 3D avatar, the second object being located on a layer above the first object, the compressed second set of point clouds having been generated and compressed offline, decompressing, using a set of decompression algorithms, the first set of compressed point clouds to obtain a first set of point clouds, each respective first point cloud corresponding to a respective frame of the set of frames, decompressing, using the set of decompression algorithms, the second set of compressed point clouds to obtain a second set of point clouds, each respective second point cloud corresponding to a respective frame of the set of frames, receiving a set of constraints associated with the first object, for each respective frame of the set of frames: projecting the respective first point cloud onto the respective frame of the animation of the body of the 3D avatar to obtain a respective first projected point cloud, regrowing the first projected point cloud to obtain a regrown point cloud, said regrowing comprising, for each given projected point in the first projected point cloud: translating the given projected point in the respective first projected point cloud towards a corresponding given first point in the first point cloud, determining if the given translated projected point in the respective first projected point cloud intersects with the second point cloud, if the given translated projected point intersects with the second point cloud: determining and adding a selected intersection point to the regrown point cloud, and if the given projected point does not intersect with the corresponding second given point: adding the corresponding given first point to the regrown point cloud, solving, using the set of constraints associated with the first object, the respective regrown point cloud to obtain a final point cloud, and outputting the respective final point cloud, the respective final point cloud representing a respective frame of a final animation of the first object interacting with the second object on the body of the 3D avatar, the respective final point cloud to be rendered.

In one or more implementations of the method, the method further comprises: rendering the respective final point cloud with the respective second point cloud and a respective frame of the animation of the body of the 3D avatar.

In one or more implementations of the method, the method further comprises, prior to said receiving the animation of the body of the 3D avatar, during an offline processing phase: receiving the animation of a body of a 3D avatar, the animation comprising a set of frames, each frame representing a respective position of the body of the 3D avatar in time, receiving an indication of the first object to be animated in relation to the body of the 3D avatar, receiving an indication of a second object to be animated in relation to the body of the 3D avatar, generating, based on the indication of the animated body of the 3D avatar and the indication of the first object, a first set of point clouds representing the first object animated in relation to the body of the 3D avatar, generating, based on the indication of the animated body of the 3D avatar and the indication of the second object, a second set of point clouds representing the second object animated in relation to the body of the 3D avatar, compressing, using a set of compression algorithms, the first set of point clouds to obtain a compressed first set of point clouds and the second set of point clouds to obtain a compressed second set of point clouds, and transmitting the first set of compressed point clouds and the compressed second set of point clouds.

In one or more implementations, the offline processing phase may be executed for performing pre-computation and compression of a plurality of objects, which may be used at a subsequent time by the online processing phase.

In one or more implementations of the method, the offline processing phase is executed by a server for a plurality of objects.

In one or more implementations of the method, the at least one processor comprises a first processor operatively connected to a second processor, the offline processing phase being executed by the first processor, and the online real-time processing phase being executed by the second processor.

In one or more implementations of the method, at least one of the first object and the second object comprises a soft body object.

In one or more implementations, the soft body object is a respective piece of garment worn by the 3D avatar.

In one or more implementations of the method, said outputting the respective final point cloud comprises smoothing points in the respective final point cloud, and outputting the smoothed points as the respective final point cloud.

In one or more implementations of the method, the method further comprises: rendering the final point cloud with a corresponding frame of the second point cloud and of the animation of the 3D avatar to obtain a respective frame of the final animation of the 3D avatar with the first object and the second object, the first object interacting with the second object, and outputting, to display device operatively connected to the at least one processor, the respective frame of the final animation.

In one or more implementations of the method, the method further comprises, prior to said rendering the final point cloud with the corresponding frame of the second point cloud and of the animation of the 3D avatar to obtain the respective frame of the final animation: calculating normals and tangents of the final points in the respective final point cloud, and said rendering comprises using triangle rasterization based on the normal and tangents of the respective final point cloud with the corresponding frame of the second point cloud and of the animation of the 3D avatar to obtain the respective frame of the final animation.

In one or more implementations of the method, the set of constraints of the first object comprises distance constraints and bending constraints.

In one or more implementations of the method, the set of decompression algorithms comprises at least one of: a geometric encoder, a lossless data encoder and an artificial intelligence (AI) auto-encoder.

In accordance with a broad aspect of the present technology, there is provided a system for performing a simulation of interactions of objects in relation to a 3D avatar in real-time, the system comprises: a non-transitory storage medium storing computer-readable instructions thereon, and at least one processor operatively connected to the non-transitory storage medium. The at least one processor, upon executing the computer-readable instructions, is configured for: during an online processing phase: receiving an animation of a body of a 3D avatar, the animation comprising a set of frames, each frame representing a respective position of the body of the 3D avatar in time, receiving a compressed first set of point clouds representing a first object animated in relation to the body of the 3D avatar, the compressed first set of point clouds having been generated and compressed offline, receiving a compressed second set of point clouds representing a second object animated in relation to the body of the 3D avatar, the second object being located on a layer above the first object, the compressed second set of point clouds having been generated and compressed offline, decompressing, using a set of decompression algorithms, the first set of compressed point clouds to obtain a first set of point clouds, each respective first point cloud corresponding to a respective frame of the set of frames, decompressing, using the set of decompression algorithms, the second set of compressed point clouds to obtain a second set of point clouds, each respective second point cloud corresponding to a respective frame of the set of frames, receiving a set of constraints associated with the first object, for each respective frame of the set of frames: projecting the respective first point cloud onto the respective frame of the animation of the body of the 3D avatar to obtain a respective first projected point cloud, regrowing the first projected point cloud to obtain a regrown point cloud. The regrowing comprises, for each given projected point in the first projected point cloud: translating the given projected point in the respective first projected point cloud towards a corresponding given first point in the first point cloud, determining if the given translated projected point in the respective first projected point cloud intersects with the second point cloud, if the given translated projected point intersects with the second point cloud: determining and adding a selected intersection point to the regrown point cloud, and if the given projected point does not intersect with the corresponding second given point: adding the corresponding given first point to the regrown point cloud, solving, using the set of constraints associated with the first object, the respective regrown point cloud to obtain a final point cloud, and outputting the respective final point cloud, the respective final point cloud representing a respective frame of a final animation of the first object interacting with the second object on the body of the 3D avatar, the respective final point cloud to be rendered.

In one or more implementations of the system, the at least one processor is further configured for: rendering the respective final point cloud with the respective second point cloud and a respective frame of the animation of the body of the 3D avatar.

In one or more implementations of the system, the at least one processor is further configured for, prior to said receiving the animation of the body of the 3D avatar, during an offline processing phase: receiving the animation of a body of a 3D avatar, the animation comprising a set of frames, each frame representing a respective position of the body of the 3D avatar in time, receiving an indication of the first object to be animated in relation to the body of the 3D avatar, receiving an indication of a second object to be animated in relation to the body of the 3D avatar, generating, based on the indication of the animated body of the 3D avatar and the indication of the first object, a first set of point clouds representing the first object animated in relation to the body of the 3D avatar, generating, based on the indication of the animated body of the 3D avatar and the indication of the second object, a second set of point clouds representing the second object animated in relation to the body of the 3D avatar, compressing, using a set of compression algorithms, the first set of point clouds to obtain a compressed first set of point clouds and the second set of point clouds to obtain a compressed second set of point clouds, and transmitting the first set of compressed point clouds and the compressed second set of point clouds.

In one or more implementations of the system, the at least one processor comprises a first processor operatively connected to a second processor. The offline processing phase is executed by the first processor, and the online real-time processing phase is executed by the second processor. As a non-limiting example, the first processor may be a processor of a server and the second processor may be a processor of a client device connected to the server. It should be noted that the offline processing phase may be executed for performing pre-computation and compression of a plurality of objects, which may be used at a subsequent time by the online processing phase.

In one or more implementations of the system, at least one of the first object and the second object comprises a soft body object.

In one or more implementations, the soft body object is a respective piece of garment worn by the 3D avatar.

In one or more implementations of the system, said outputting the final point cloud comprises smoothing points in the final point cloud, and outputting the smoothed points as the final point cloud.

In one or more implementations of the system, the at least one processor is further configured for: rendering the final point cloud with a corresponding frame of the second point cloud and of the animation of the 3D avatar to obtain a respective frame of the final animation of the 3D avatar with the first object and the second object, the first object interacting with the second object, and outputting, to display device operatively connected to the at least one processor, the respective frame of the final animation.

In one or more implementations of the system, the set of constraints of the first object comprises distance constraints and bending constraints.

In accordance with a broad aspect of the present technology, there is provided a non-transitory storage medium comprising computer-readable instructions stored thereon for performing a simulation of interactions of objects in relation to a 3D avatar in real-time, the computer-readable instructions, upon being executed by at least one processor, cause the at least one processor to perform: during an online processing phase: receiving an animation of a body of a 3D avatar, the animation comprising a set of frames, each frame representing a respective position of the body of the 3D avatar in time, receiving a compressed first set of point clouds representing a first object animated in relation to the body of the 3D avatar, the compressed first set of point clouds having been generated and compressed offline, receiving a compressed second set of point clouds representing a second object animated in relation to the body of the 3D avatar, the second object being located on a layer above the first object, the compressed second set of point clouds having been generated and compressed offline, decompressing, using a set of decompression algorithms, the first set of compressed point clouds to obtain a first set of point clouds, each respective first point cloud corresponding to a respective frame of the set of frames, decompressing, using the set of decompression algorithms, the second set of compressed point clouds to obtain a second set of point clouds, each respective second point cloud corresponding to a respective frame of the set of frames, receiving a set of constraints associated with the first object, for each respective frame of the set of frames: projecting the respective first point cloud onto the respective frame of the animation of the body of the 3D avatar to obtain a respective first projected point cloud, regrowing the first projected point cloud to obtain a regrown point cloud, said regrowing comprises, for each given projected point in the first projected point cloud: translating the given projected point in the respective first projected point cloud towards a corresponding given first point in the first point cloud, determining if the given translated projected point in the respective first projected point cloud intersects with the second point cloud, if the given translated projected point intersects with the second point cloud: determining and adding a selected intersection point to the regrown point cloud, and if the given projected point does not intersect with the corresponding second given point: adding the corresponding given first point to the regrown point cloud, solving, using the set of constraints associated with the first object, the respective regrown point cloud to obtain a final point cloud, and outputting the respective final point cloud, the respective final point cloud representing a respective frame of a final animation of the first object interacting with the second object on the body of the 3D avatar, the respective final point cloud to be rendered.

In one or more implementations of the non-transitory storage medium, the non-transitory storage medium further comprises computer-readable instructions that cause the at least one processor to perform, prior to said receiving the animation of the body of the 3D avatar, during an offline processing phase: receiving the animation of a body of a 3D avatar, the animation comprising a set of frames, each frame representing a respective position of the body of the 3D avatar in time, receiving an indication of the first object to be animated in relation to the body of the 3D avatar, receiving an indication of a second object to be animated in relation to the body of the 3D avatar, generating, based on the indication of the animated body of the 3D avatar and the indication of the first object, a first set of point clouds representing the first object animated in relation to the body of the 3D avatar, generating, based on the indication of the animated body of the 3D avatar and the indication of the second object, a second set of point clouds representing the second object animated in relation to the body of the 3D avatar, compressing, using a set of compression algorithms, the first set of point clouds to obtain a compressed first set of point clouds and the second set of point clouds to obtain a compressed second set of point clouds, and transmitting the first set of compressed point clouds and the compressed second set of point clouds.

Terms and Definitions

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "computing device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that a computing device in the present context is not precluded from acting as a server to other computing device. The use of the expression "computing device" does not preclude multiple computing devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus, information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 20 illustrates a flow chart of method of generating compressed point clouds of objects to be animated, the method being executed offline in accordance with one or more non-limiting implementations of the present technology.

FIG. 21 and FIG. 22 illustrate a flow chart of a method of performing online simulation of object-object interaction in accordance with one or more non-limiting implementations of the present technology.

DETAILED DESCRIPTION

Figure 1:
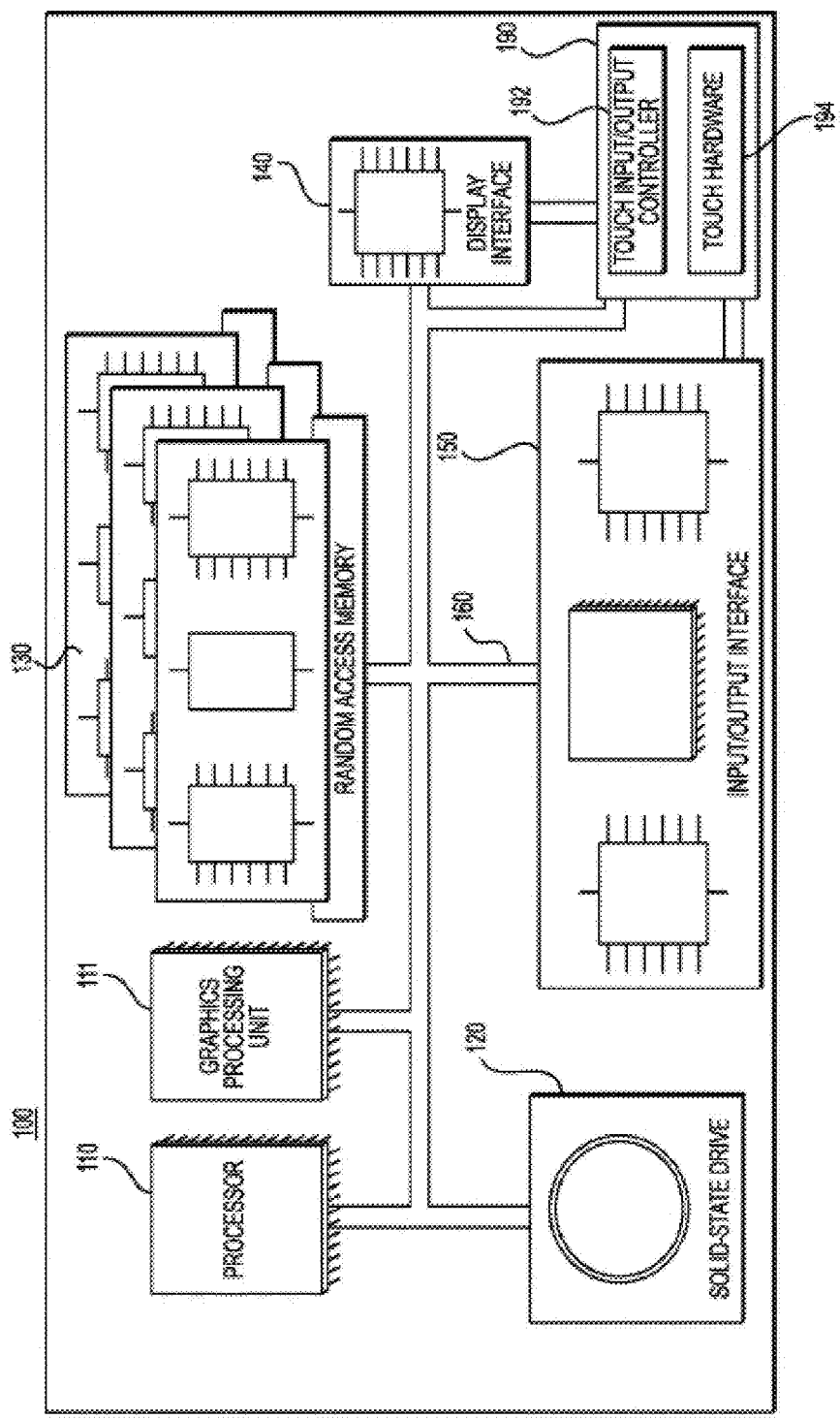
FIG. 1 illustrates a schematic diagram of a computing device in accordance with one or more non-limiting implementations of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In one or more non-limiting implementations of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, non-limiting examples illustrating various implementations of aspects of the present technology are disclosed hereinafter.

Computing Device

Referring to FIG. 1, there is shown a computing device 100 suitable for use with some implementations of the present technology, the computing device 100 comprising various hardware components including one or more single or multi-core processors collectively represented by processor 110, a graphics processing unit (GPU) 111, a solid-state drive 120, a random-access memory 130, a display interface 140, and an input/output interface 150.

Communication between the various components of the computing device 100 may be enabled by one or more internal and/or external buses 160 and/or physical interconnections (e.g., Land Grid Array (LGA), Pin Grid Array (PGA), a PCI express bus, SATA, NVMe, USB, etc.) to which the various hardware components are electronically coupled.

The input/output interface 150 may be coupled to a touchscreen 190 and/or to the one or more internal and/or external buses 160. The touchscreen 190 may be part of the display. In one or more implementations, the touchscreen 190 is the display. The touchscreen 190 may equally be referred to as a screen 190. In the implementations illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In one or more implementations, the input/output interface 150 may be connected to a keyboard (not shown), a mouse (not shown) or a trackpad (not shown) allowing the user to interact with the computing device 100 in addition or in replacement of the touchscreen 190. In one or more other implementations, the input/output interface 150 may enable a user to interact by using voice.

According to implementations of the present technology, the solid-state drive 120 stores program instructions suitable for being loaded into the random-access memory 130 and executed by the processor 110 and/or the GPU 111 for inter alia: (i) performing offline physics modeling and compression of objects including soft bodies such as garments interacting with a body of a 3D avatar; and/or (ii) online generation of a simulation of interactions of the two objects with the movement of the body of the 3D avatar. For example, the program instructions may be part of a library or an application.

The computing device 100 may be implemented as a server, a desktop computer, a laptop computer, a tablet, a smartphone, a personal digital assistant or any device that may be configured to implement the present technology, as it may be understood by a person skilled in the art.

Furthermore, aspects of the present technology may be practiced in an electrical circuit comprising discrete electronic elements, packaged or integrated electronic chips containing logic gates, a circuit utilizing a microprocessor, or on a single chip containing electronic elements or microprocessors, which are included within the term "processor", "at least one processor", "processing device", "processing unit" and the like. For example, aspects of the disclosure may be practiced via a system-on-a-chip (SoC) where each or many of the components illustrated in FIG. 1 may be integrated onto a single integrated circuit. Such a SoC device may include one or more processing units, graphics units, communications units, system virtualization units, and various application functionality all of which are integrated (or "burned") onto the chip substrate as a single integrated circuit. Aspects of the present technology may also be practiced using other technologies capable of performing logical operations such as, for example, AND, OR, and NOT, including but not limited to mechanical, optical, fluidic, and quantum technologies.

System

Figure 2:
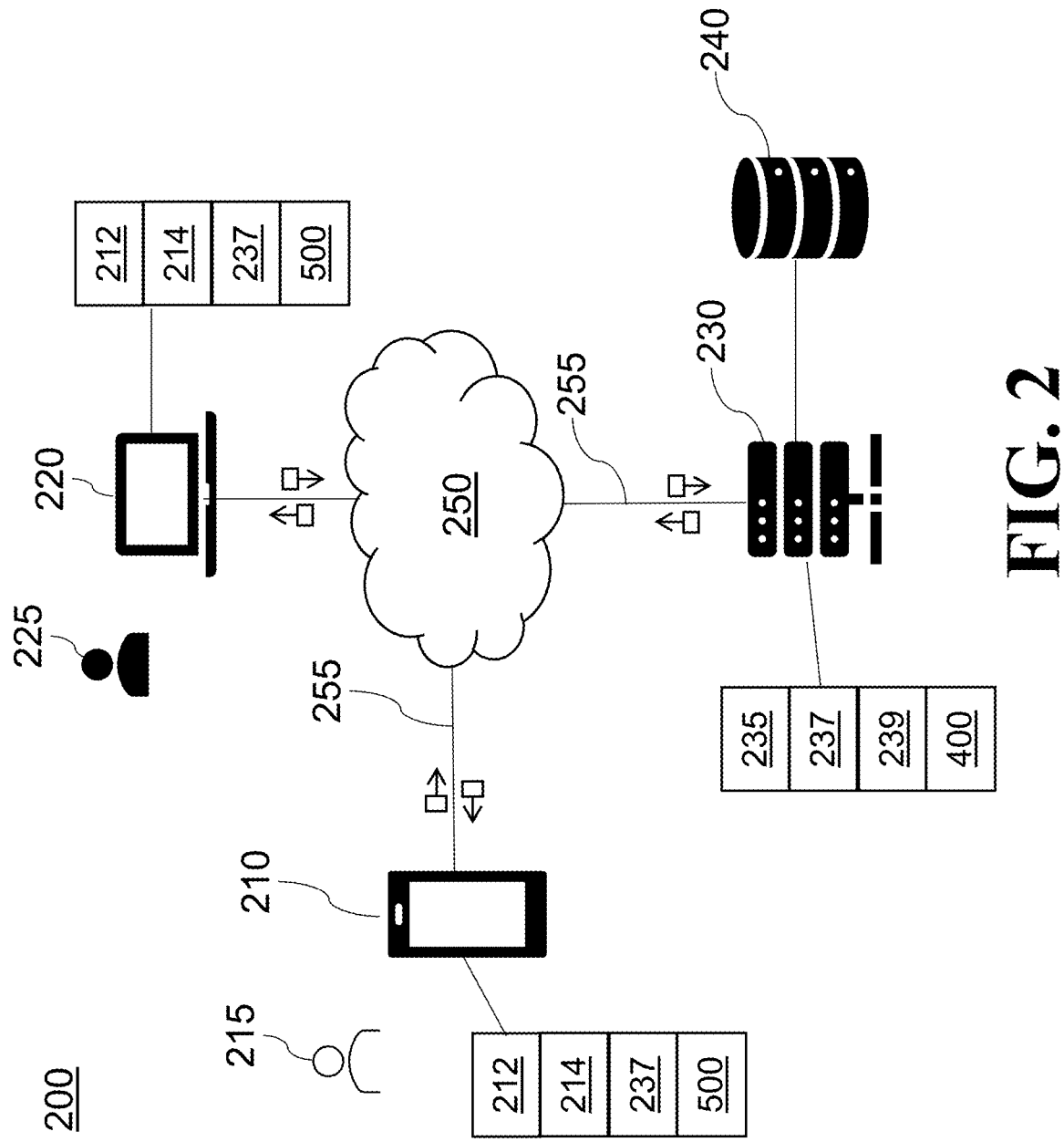
FIG. 2 illustrates a schematic diagram of a communication system and environment in accordance with one or more non-limiting implementations of the present technology.

Referring to FIG. 2, there is shown a schematic diagram of a communication system and environment 200, the communication system and environment 200 being suitable for implementing one or more non-limiting implementations of the present technology. It is to be expressly understood that the communication system and environment 200 as shown is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the communication system and environment 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the communication system and environment 200 may provide in certain instances simple implementations of the present technology, and that where such is the case they have been presented in this manner as an aid to understanding. As persons skilled in the art would understand, various implementations of the present technology may be of a greater complexity.

The communication system and environment 200 comprises inter alia a first client device 210 associated with a first user 205, a second client device 220 associated with a second user 225, a server 230, and a database 240 communicatively coupled over a communications network 250.

First Client Device

The communication system and environment 200 comprises a first client device 210. The first client device 210 is associated with the user 205. As such, the first client device 210 can sometimes be referred to as a "electronic device", "end user device" or "client electronic device". It should be noted that the fact that the first client device 210 is associated with the user 205 does not need to suggest or imply any mode of operation—such as a need to log in, a need to be registered, or the like.

The first client device 210 comprises one or more components of the computing device 100 such as one or more single or multi-core processors collectively represented by processor 110, the graphics processing unit (GPU) 111, the solid-state drive 120, the random-access memory 130, the display interface 140, and the input/output interface 150.

In one or more implementation, the first client device 210 is configured to execute inter alia: (i) a game application 212; (ii) a 3D environment platform 214; (ii) a game engine 237; and (iii) an online object-object interaction simulation procedure 500.

How the first client device 210 is configured to do so will be explained in more detail hereinafter.

It will be appreciated that the first client device 210 may be implemented as a server, a desktop computer, a laptop, a smartphone and the like.

In one or more implementations, the first client device 210 is configured to execute a browser application (not shown). The purpose of the given browser application is to enable the first user 205 to access one or more web resources. How the given browser application is implemented is not particularly limited. Non-limiting examples of the given browser application that is executable by the first client device 210 include Google™ Chrome™, Mozilla™ Firefox™, Microsoft™ Edge™, and Apple™ Safari™.

In one or more implementations, the first client device 210 may be used to create or select one or more of: (i) a 3D avatar; (ii) animations of the 3D avatar; (iii) a virtual environment in which the 3D avatar is animated; and (iv) two or more objects including garments that interact with the 3D avatar.

In one or more implementations, the first client device 210 executes a game application, which comprises one or more of a rendering engine (not shown) for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features.

In one or more implementations, each of the 3D avatar, animations of the 3D avatar, virtual environment of the 3D avatar and the two or more objects may be created or selected as part of the game application executed by the first client device 210.

In one or more implementations, the first client device 210 may transmit, via the communication network 250, an indication of the one or more of the 3D avatar, animations of the 3D avatar, virtual environment of the 3D avatar and the two or more objects.

In one or more implementations, the first client device 210 may receive, via the communication network 250, compressed point clouds representing objects animated with respect to a 3D avatar and execute an online object-object interaction simulation procedure 500 to simulate and render an animation of the 3D avatar with the objects interacting.

In one or more implementations, the first client device 210 executes a game application 212. In one implementation, the game application 212 may permit users to use and interact with online gaming platform 235, such as control a virtual character in a virtual game hosted by online gaming platform 235, or view or upload content, such as games, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server, such as the server 230. In another example, the game application may be a native application (e.g., a mobile application, app, or a gaming program) that is installed and executes local to client device 210 and allows users to interact with online gaming platform 235. The game application may render, display, or present the content (e.g., a web page, a media viewer) to a user. In an implementation, the game application may also include an embedded media player (e.g., a Flash® player) that is embedded in a web page.

According to aspects of the disclosure, the game application 212 may be an online gaming platform application for users to build, create, edit, upload content to the online gaming platform 235 as well as interact with online gaming platform 235 (e.g., play games hosted by online gaming platform 235). As such, the game application 212 may be provided to the client device 210 by the online gaming platform 212. In another example, the game application may be an application that is downloaded from a server. In one or more implementations, the first client device 210 executes a 3D environment platform 214.

The 3D environment platform 214 is a software application that can support 3D avatars with layered clothing, in accordance with some implementations. The 3D environment platform 214 is described hereinafter in the context of a gaming platform purely for purposes of explanation, and various other implementations can provide other types of 3D environment platforms, such as online meeting platforms, virtual reality (VR) or augmented reality (AR) platforms, or other types of platforms that can provide 3D content. The description provided herein for the gaming platform and other elements of the system architecture can be adapted to be operable with such other types of 3D environment platforms. Online gaming platforms (also referred to as "user-generated content platforms" or "user-generated content systems") offer a variety of ways for users to interact with one another, such as while the users are playing an electronic game. For example, users of an online gaming platform may work together towards a common goal, share various virtual gaming items, send electronic messages to one another, and so forth. Users of an online gaming platform may play games using characters, such as the 3D avatars having layered clothing as described above, which the users can navigate through a 3D world rendered in the electronic game.

An online gaming platform 235 may also allow users of the platform to create and animate avatars, as well as allowing the users to create other graphical objects to place in the 3D world. For example, users of the online gaming platform may be allowed to create, design, and customize the avatar, and to create, design, and fit various clothing items onto the avatar.

Second Client Device

The system and environment 200 comprises a second client device 220. The second client device 220 is associated with the second user 225. As such, the second client device 220 can sometimes be referred to as a "electronic device", "end user device" or "client electronic device". It should be noted that the fact that the second client device 220 is associated with the second user 225 does not need to suggest or imply any mode of operation-such as a need to log in, a need to be registered, or the like.

The second client device 220 comprises one or more components of the computing device 100 such as one or more single or multi-core processors collectively represented by processor 110, the graphics processing unit (GPU) 111, the solid-state drive 120, the random-access memory 130, the display interface 140, and the input/output interface 150.

In one or more implementations, the second client device 220 is configured to execute software similar to the software executed by the first client device, such as the game application 212, the 3D environment platform 214, the game engine 237, and the online object-object interaction simulation procedure 500.

It will be appreciated that the second client device 220 may be implemented as a server, a desktop computer, a laptop, a smartphone and the like.

In one or more implementations, the second client device 220 has different components and/or processing and memory capabilities than the first client device 210. As a non-limiting example, the first client device 210 may be a tablet, and the second client device 220 may be a smartphone.

Server

The server 230 is configured to inter alia: (i) execute an online gaming platform 235; (ii) execute a game engine 237; (iii) execute a game 239; and (iv) execute an offline generation procedure 400.

In one or more alternative implementations, the server 230 may execute an online object-object interaction simulation procedure 500.

How the server 230 is configured to do so will be explained in more detail hereinafter with reference to FIG. 4.

It will be appreciated that the server 230 can be implemented as a conventional computer server and may comprise at least some of the features of the computing device 100 shown in FIG. 1. In a non-limiting example of one or more implementations of the present technology, the server 230 is implemented as a server running an operating system (OS). Needless to say that the server 230 may be implemented in any suitable hardware and/or software and/or firmware or a combination thereof. In the disclosed non-limiting embodiment of present technology, the server 230 is a single server. In one or more alternative non-limiting implementations of the present technology, the functionality of the server 230 may be distributed and may be implemented via multiple servers (not shown).

The implementation of the server 230 is well known to the person skilled in the art. However, the server 230 comprises a communication interface (not shown) configured to communicate with various entities (such as the database 240, for example and other devices potentially coupled to the communication network 250) via the communication network 250. The server 230 further comprises at least one computer processor (e.g., the processor 110 or GPU 111 of the computing device 100) operationally connected with the communication interface and structured and configured to execute various processes to be described herein.

Database

A database 240 is communicatively coupled to the server 230, the first client device 210 and the second client device 220 via the communications network 250 but, in one or more alternative implementations, the database 240 may be directly coupled to one or more of the server 230, the first client device 210 and the second client device 220 without departing from the teachings of the present technology. Although the database 240 is illustrated schematically herein as a single entity, it will be appreciated that the database 240 may be configured in a distributed manner, for example, the database 240 may have different components, each component being configured for a particular kind of retrieval therefrom or storage therein.

The database 240 may be a structured collection of data, irrespective of its particular structure or the computer hardware on which data is stored, implemented or otherwise rendered available for use. The database 240 may reside on the same hardware as a process that stores or makes use of the information stored in the database 240 or it may reside on separate hardware, such as on the server 230. The database 240 may receive data from the server 230 for storage thereof and may provide stored data to the server 230 for use thereof.

In one or more implementations, the database 240 may store ML file formats, such as .tfrecords, .csv, .npy, and .petastorm as well as the file formats used to store models, such as .pb and .pkl. The database 240 may also store well-known file formats such as, but not limited to image file formats (e.g., .png, jpeg), video file formats (e.g., .mp4, .mkv, etc), archive file formats (e.g., .zip, .gz, .tar, .bzip2), document file formats (e.g., .docx, .pdf, .txt) or web file formats (e.g., .html).

In one or more implementation, the database 240 may store, for example, graphical objects that are rendered in the game by the game engine (not shown) or by the game applications 212, as well as the configuration/properties information of the graphical objects (such as coordinate information of point clouds, size dimensions, etc. that are usable for generating point clouds such as described herein).

In some embodiments, the database 240 can be part of one or more separate content delivery networks that provide the graphical objects rendered in the game 239. For instance, an avatar creator can publish avatar templates in library accessible at a first storage device, and a clothing creator can (separately and independently from the avatar creator) publish clothing templates in a library accessible at a second storage device. Then, the game application 212 may pull (or have pushed to it) graphical objects (avatars and clothing items) stored in the first/second storage devices, for computation/compilation/deformation at runtime for presentation during the course of playing the game.

In one or more implementations, the database 240 is configured to store parameters of a set of compression algorithms 445 and a set of decompression algorithms 535 associated therewith to respectively compress point clouds and decompress point clouds in the context of the present technology.

In one or more implementations, the set of compression algorithms 445 include one or more of geometric encoders, lossless data encoders and an artificial intelligence (AI) auto-encoders.

Non-limiting examples of geometric encoding algorithms include Geometric encoding algorithms include Signed Distance Function (SDF) encoding, occupancy networks, coordinate-based encoding, voxel-based encoding, point cloud encoding, and mesh-based encoding.

Non-limiting examples of lossless data encoders include one or more of octree-based encoding, transform-based encoding, graph transform encoding, LASzip and predictive lossless coding.

Non-limiting examples of artificial intelligence (AI) auto-encoders include one or more of neural networks and deep neural networks trained and configured to perform compression of point clouds.

Communication Network

In one or more implementations of the present technology, the communications network 250 is the Internet. In one or more alternative non-limiting implementations, the communication network 250 may be implemented as any suitable local area network (LAN), wide area network (WAN), a private communication network or the like. It will be appreciated that implementations for the communication network 250 are for illustration purposes only. How a communication link 255 (not separately numbered) between the first client device 210, the server 230, the database 240, and/or another electronic device (not shown) and the communications network 250 is implemented will depend inter alia on how each electronic device is implemented.

The communication network 250 may be used in order to transmit data packets amongst the server 230, the database 240, the first client device 210, and the second client device 220. For example, the communication network 250 may be used to transmit requests from the first client device 210 to the server 230. In another example, the communication network 250 may be used to transmit data packets from the second client device 220 to the server 230.

The storage mediums of the first client device 210 may store, for example, graphical objects that are rendered in the game by the game engine (not shown) or by the game applications 212, as well as the configuration/properties information of the graphical objects (such as coordinate information of feature points, size dimensions, etc. that are usable for deformation such as described herein after).

In some embodiments, can be part of one or more separate content delivery networks that provide the graphical objects rendered in the game 239. For instance, an avatar creator can publish avatar templates in library accessible at a first storage device, and a clothing creator can (separately and independently from the avatar creator) publish clothing templates in a library accessible at a second storage device. Then, the game application 212 may pull (or have pushed to it) graphical objects (avatars and clothing items) stored in the first/second storage devices, for computation/compilation/deformation at runtime for presentation during the course of playing the game.

In some implementations, the online gaming platform 235 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming platform 235 and to provide a user with access to online gaming platform 235. The online gaming platform 235 may also include a website (e.g., a webpage) or application back-end software that may be used to provide a user with access to content provided by online gaming platform 235. For example, a user may access online gaming platform 235 using the game application 212 on the client device 210, 220. n some implementations, online gaming platform 235 may be a type of social network providing connections between users or a type of user-generated content system that allows users (e.g., end-users or consumers) to communicate with other users on the online gaming platform 235, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming platform 235 may be a virtual gaming platform. For example, the gaming platform may provide single-player or multiplayer games to a community of users that may access or interact with games using client devices 210, 220 via the communication network 250. In some implementations, games (also referred to as "video game," "online game," or "virtual game" etc. herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to interaction of one or more players using client devices (e.g., the client device 210, 220) within a game (e.g., the game 239) or the presentation of the interaction on a display or other user interfaces of a client device 210, 220.

In some implementations, the game 239 can include an electronic file that can be executed or loaded using software, firmware or hardware configured to present the game content (e.g., digital media item) to an entity. In some implementations, the game application 212 may be executed and the game 239 rendered in connection with the game engine 237. In some implementations, the game 239 may have a common set of rules or common goal, and the environments of a game 239 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a 3D environment. The one or more environments of the game 239 may be collectively referred to a "world" or "gaming world" or "virtual world" or "universe" herein. For example, a user may build a virtual environment that is linked to another virtual environment created by another user. A character of the virtual game (such as a 3D avatar having layered clothing as described herein) may cross the virtual border to enter the adjacent virtual environment.

It may be noted that 3D environments or 3D worlds use graphics that provide a three-dimensional representation of geometric data representative of game content (or at least present game content to appear as 3D content whether or not 3D representation of geometric data is used). 2D environments or 2D worlds use graphics that provide two-dimensional representation of geometric data representative of game content.

In some implementations, the online gaming platform 235 can host one or more games and can permit users to interact with the games 1106 using the game application 212 of the client device 210, 220. Users of the online gaming platform 235 may play, create, interact with, or build games, communicate with other users, and/or create and build objects (e.g., also referred to as "item(s)" or "game objects" or "virtual game item(s)" or "graphical objects" herein) of games. For example, in generating user-generated virtual items, users may create characters, animation for the characters, decoration (e.g., clothing, skins, accessories, etc.) for the characters, one or more virtual environments for an interactive game, or build structures used in the game 239, among others. In some implementations, users may buy, sell, or trade game virtual game objects, such as in-platform currency (e.g., virtual currency), with other users of the online gaming platform 235.

In some implementations, online gaming platform 235 may transmit game content to game applications (e.g., the game application 212). In some implementations, game content (also referred to as "content" herein) may refer to any data or software instructions (e.g., game objects, game, user information, video, images, commands, media item, etc.) associated with online gaming platform 235 or game applications. In some implementations, game objects (e.g., also referred to as "item(s)" or "objects" or "virtual game item(s)" herein) may refer to objects that are used, created, shared, or otherwise depicted in the game 239 of the online gaming platform 235 or game applications 212 of the client devices 210, 220. For example, game objects may include a part, model, character or components thereof (like faces, arms, lips, etc.), tools, weapons, clothing, buildings, vehicles, currency, flora, fauna, components of the aforementioned (e.g., windows of a building), and so forth.

In some implementations, online gaming platform 235 or client devices 210, 220 may include the game engine 237 or game application 239. In some implementations, game engine 237 may be used for the development or execution of games 1106. For example, game engine 237 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 237 may generate commands that help compute and render the game (e.g., rendering commands, collision commands, animation commands, physics commands, etc.), including commands to select an avatar, customize the avatar, select clothing items, deform the clothing items as layers on the avatar, and various other operations described herein. In some implementations, game applications of client devices 210, 220 may work independently, in collaboration with game engine 237 of online gaming platform 235, or a combination of both, in order to perform the operations described herein related to deforming and rendering layered clothing at runtime.

In some implementations, both the online gaming platform 235 and client devices 210, 220 execute a game engine or a game application 237. The online gaming platform 235 using game engine 237 may perform some or all the game engine functions (e.g., generate physics commands, animation commands, rendering commands, etc., including deformation of clothing layers as described above), or offload some or all the game engine functions to the game application 212 of client device 210, 220. In some implementations, each game 239 may have a different ratio between the game engine functions that are performed on the online gaming platform 235 and the game engine functions that are performed on the client devices 210, 220.

For example, the game engine 237 of the online gaming platform 235 may be used to generate physics commands in cases where there is a collision between at least two game objects, while the additional game engine functionality (e.g., generate rendering commands, including deforming and displaying layered clothing) may be offloaded to the client device 210, 220. In some implementations, the ratio of game engine functions performed on the online gaming platform 235 and client device 210, 220 may be changed (e.g., dynamically) based on gameplay conditions. For example, if the number of users participating in gameplay of a particular game 239 exceeds a threshold number, the online gaming platform 235 may perform one or more game engine functions that were previously performed by the client devices 210, 220.

For example, users may be playing a game 239 on client devices 210, 220, and may send control instructions (e.g., user inputs, such as right, left, up, down, user election, or character position and velocity information, etc.) to the online gaming platform 235. Subsequent to receiving control instructions from the client devices 210, 220, the online gaming platform 235 may send gameplay instructions (e.g., position and velocity information of the characters participating in the group gameplay or commands, such as rendering commands, collision commands, etc.) to the client devices 210, 220 based on control instructions. For instance, the online gaming platform 235 may perform one or more logical operations (e.g., using game engine 237) on the control instructions to generate gameplay instruction for the client devices 210, 220. In other instances, online gaming platform 235 may pass one or more or the control instructions from one client device 210, 220 to other client devices participating in the game 239. The client devices 210, 220 may use the gameplay instructions and render the gameplay for presentation on the displays of client devices 210, 220, including the avatars with layered clothing described above.

Figure 3:
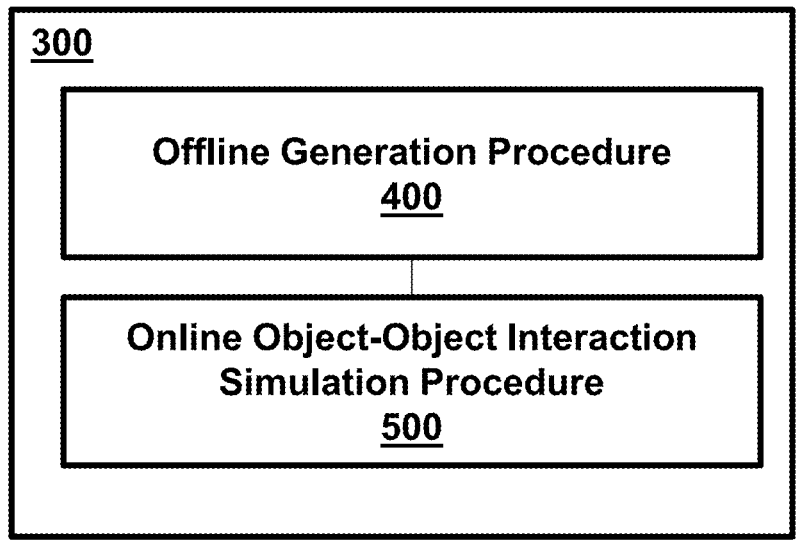
FIG. 3 illustrates a schematic diagram of an offline and online object to object interaction procedure 300 procedure in accordance with one or more non-limiting implementations of the present technology.

With reference to FIG. 3, there is shown a schematic diagram of an offline and online object-to-object interaction procedure 300 in accordance with one or more non-limiting embodiments of the present technology.

The offline and online object-to-object interaction procedure 300 300 comprises inter alia an offline generation procedure 400 and an online object-object interaction simulation procedure 500.

The offline generation procedure 400 is used to perform offline physics modeling and compression of objects including soft bodies such as garments interacting with a body of a 3D avatar. The online object-object interaction simulation procedure 500 is used to decompress the objects, project the object and regrow the objects and solve collisions in their interactions to obtain a final point cloud to be rendered as a frame of the animation of the body of the 3D avatar with the two objects.

The offline generation procedure 400 performs offline pre-computation of arbitrarily complex physics states. Once completed, the offline generation procedure 400 uses compression and/or encoding techniques to compress the point clouds, and transmits the compressed point clouds to respective client devices 210, 220 such that it can be decompressed and animated realistically using the online object-object interaction simulation procedure 500. As such, the offline generation procedure 400 and the online object-object interaction simulation procedure 500 may be executed by different computing devices (e.g., server 230 and client devices 210, 220)

Purely for purposes of illustration and explanation, various implementations are described herein in the context of 3D avatars that are used in a 3D game provided by a gaming platform. It is appreciated that such gaming environments are merely examples. Other implementations of the technology described herein may be applied to other types of 3D environments, such as a virtual reality (VR) conference, a 3D session (e.g., an online lecture or other type of presentation involving 3D avatars), an augmented reality (AR) session, or in other types of 3D environments that may include one or more users that are represented in the 3D environment by one or more 3D avatars.

At runtime during a game or other 3D session, a player or user (e.g. first user 205 or second user 215) accesses the body library to select a particular body, and accesses the clothing library to select pieces of clothing to place on the selected body via a user interface of a client device (e.g., first client device 210 and second client device 220, respectively). The 3D environment platform that presents the avatars then implements the procedures described below (by suitable deformations, determined automatically) one or more objects such as piece of clothing to conform to the shape of the body, thereby automatically fitting the piece of clothing onto the body (and any intermediate layers, if worn by the avatar). The user can further select an additional piece of clothing to fit over an underlying piece of clothing (layered clothing).

Offline Generation Procedure

Figure 4:
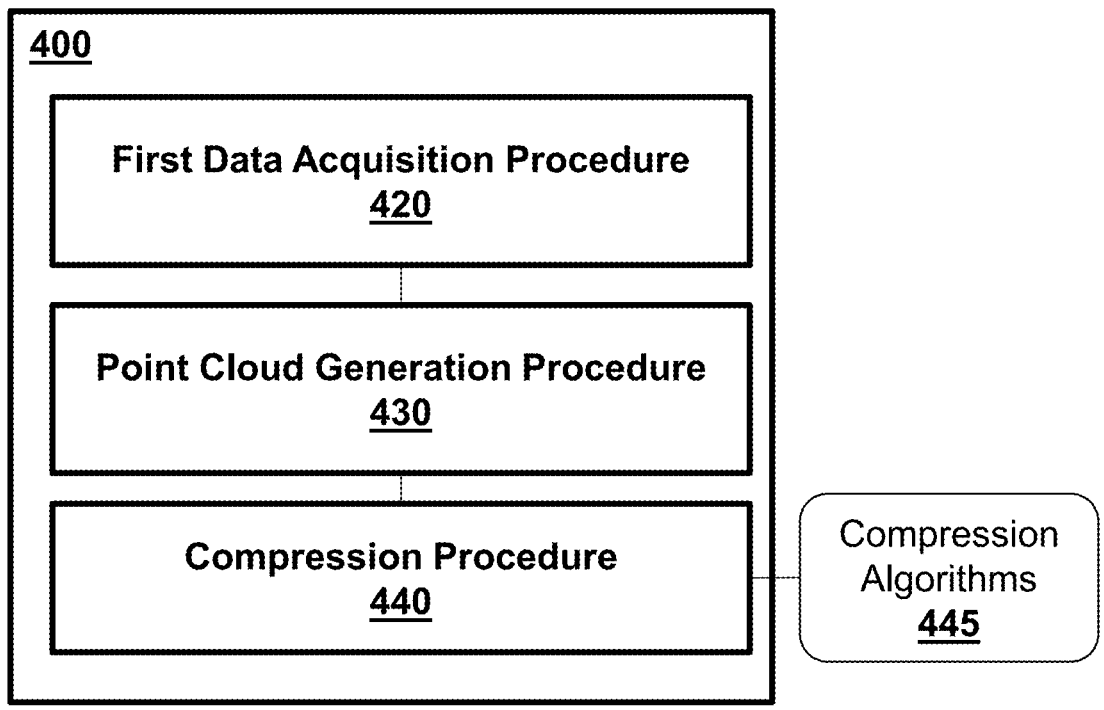
FIG. 4 illustrates a schematic diagram of an offline generation procedure in accordance with one or more non-limiting implementations of the present technology.

With reference to FIG. 4, there is shown a schematic diagram of an offline generation procedure 400 in accordance with one or more non-limiting implementations of the present technology.

In one or more implementations of the present technology, the server 230 executes the offline generation procedure 400. In alternative implementations, the server 230 may execute at least a portion of offline generation procedure 400, and one or more other servers (not shown) may execute other portions of the offline generation procedure 400.

The purpose of the offline generation procedure 400 is to generate and compress point clouds representing a movement over time of individual objects with respect to the movement of the body of a 3D avatar. Once compressed, the point clouds of selected objects to be animated with respect to the body of the 3D avatar may be retrieved to perform the online object-object interaction simulation procedure 500.

The offline generation procedure comprises inter alia a first data acquisition procedure 420, a point cloud generation procedure 430, and a compression procedure 440.

First Data Acquisition Procedure

The first data acquisition procedure 420 is configured to inter alia receive: (i) an indication of an animation of a 3D avatar; (ii) an indication of a first object to be animated with respect to the body of the 3D avatar; (iii) an indication of a second object to be animated with respect to the body of the 3D avatar.

In one or more implementations, the first and second objects are objects that may have a respective portion linked to the body of the 3D avatar at a given moment in time during a movement of the body of the 3D avatar in an animation.

In one or more implementations, at least a portion of the second object is to be layered over at least a portion of the first object, i.e., there may be presence of interactions between the second object and the first object to conform to each other and to the body of the 3D avatar when it is animated. As a first non-limiting example, the first object may represent a piece of lower body garment such as pants worn by the 3D avatar, and the second object may represent a piece of upper body garment such as a t-shirt tucked in part in the pants of the person, which in real-life may interact with each other and deform when the body of the person moves.

The objects may be ordered in layers in relation to the body of the 3D avatar, in accordance with some implementations. In one or more implementations, the objects may be hierarchically ordered.

The order/sequence in which clothing layers and other graphical objects are placed on the body of the 3D avatar may be based on a logical arrangement. For instance, socks may be defined as items that are to be placed directly over a foot, and that are placed in a layer before shoes (which may be placed over the socks).

The body of the 3D avatar may form a base (first level) graphical object. Over this base graphical object, the second level of graphical objects may be placed, such as socks, hand accessories (e.g., a ring) makeup, hair accessories, etc.

After the second level, subsequent levels of graphical objects in the hierarchy may follow in sequence, such as clothing (inner wear), shoes, clothing (outer wear), accessories (e.g., for neck like scarves; piercings for ear, nose, brow; etc.), hair, and other accessories (e.g., front/back/shoulder accessories, hat, etc.).

It is to be appreciated that the graphical objects and set of the various levels of graphical objects are merely examples. Other implementations can include different/fewer/additional graphical objects than those described, and such graphical objects may be arranged in different levels and in a sequence (or out of sequence) relative to the provided example.

In one or more implementations, the first data acquisition procedure 420 may receive a third object to be animated with respect to the body of the 3D avatar, a fourth object to be animated with respect to the body of the 3D avatar, etc. In such implementations, at least a portion of the third object would be layered over at least a respective portion of the second object, at least a portion of the fourth object would be layered over at least a respective portion of the third object, etc. It will be appreciated that the number of objects is not limited in the context of the present technology.

The first data acquisition procedure 420 is configured to receive an indication of an animation of a 3D avatar.

In one or more implementations, the animation of the body of the 3D avatar is represented as a set of positions of the body for a set of time frames.

In one or more implementations, the 3D avatar includes skeleton and a skin. In one or more other implementations, the 3D avatar may be represented by an avatar point cloud with polygons such as triangles.

The skeleton represents the structure of the different bones in the body of the 3D avatar and are used to move the avatar's limbs. The skeleton defines a hierarchy of bones which are connected by joints.

In one or more implementation, the skeleton of the 3D avatar may include one or more of head, torso, hip, right foot, left foot, left lower leg, right lower leg, left upper leg, right upper leg, left hand, right hand, left lower arm, right lower arm, left upper arm, and right upper arm. It will be appreciated that the number of parts in any body shape may be greater or fewer due to the omission of a hand, lower arm, and upper arm. Furthermore, other body shapes may involve a fewer or greater numbers of body parts, depending on factors such as body geometry, desired resolution, processing capability, type of avatar character (e.g., animal, alien, monster, and so forth), etc.

The skin of the avatar is a deformable surface comprising a set of vertices, edges and faces forming a contiguous, three-dimensional representation of the 3D avatar's external appearance.

It will be appreciated that the 3D avatar may be generated using 3D avatar model creation process, a skeleton creation process, a rigging process which includes binding the skeleton to the mesh and weight painting, and a skinning process which includes deformation process to deform the mesh according to the movement of the bones to mimic natural movement.

Figure 6:
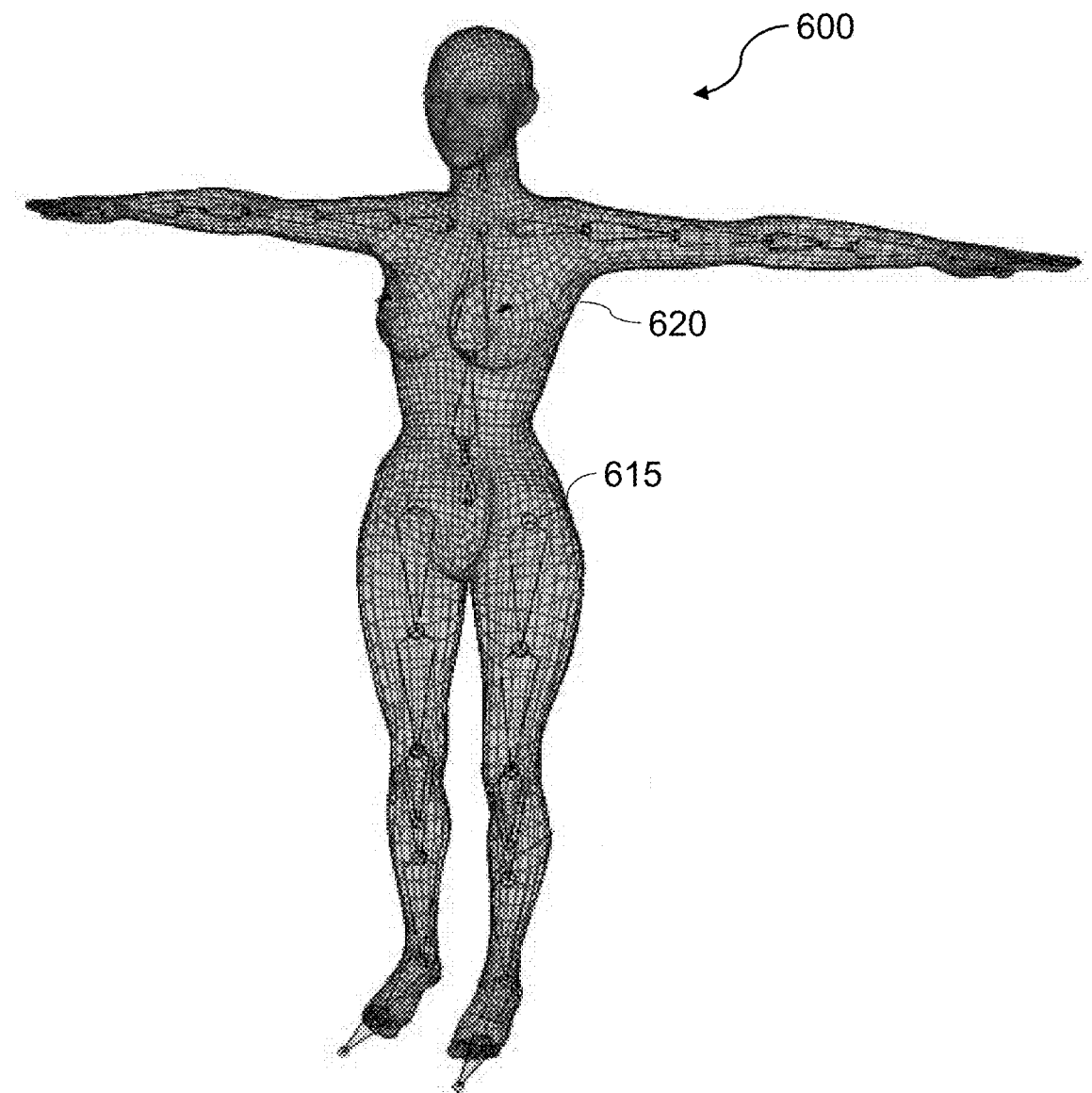
FIG. 6 illustrates a non-limiting example of a body of a 3D avatar of a woman, where a skin including vertices and quads is superposed on a skeleton in accordance with one or more non-limiting embodiments of the present technology.

FIG. 6 illustrates a non-limiting example of a body of a 3D avatar 600 of a woman, where a skin 615 including vertices and quads is superposed on a skeleton 610.

In one or more implementations, the 3D avatar is animated by using skinning techniques. Skinning, which is also known as vertex skinning, bone skinning, or skeletal deformation, is a process in animating 3D avatars and models in video games, films, and other applications involving 3D graphics. Skinning enables an avatar's soft body mesh (e.g., muscles and skin) to move convincingly in accordance with the movement of the underlying skeletal structure.

In one or more implementations, the animation of the 3D avatar represents the location of the coordinates of the body of the 3D avatar, which may correspond to different time frames so as to represent motion of the body of the 3D avatar in time.

The first data acquisition procedure 420 is configured to receive an indication of a first object.

In one or more implementations, the indication of the first object may be received from the first client device 210 and may correspond to a selection of an element in a graphical user interface (GUI) on the first client device 210. In one or more implementations, the first object may have been created, as a non-limiting example by the first user 205 in a graphical user interface (GUI) part of a gaming application executed by the first client device 210.

As a non-limiting example, the indication of the first object may correspond to a piece of garment to be worn by the 3D avatar, e.g., a piece of clothing having been selected or created by the user 205 of the first client device 210. It will be appreciated that the indication of the first object may correspond to or to a pointer or identifier that enables retrieving the first object by the server 230 (e.g., from the database 240).

The first object is an object that will be located on a layer below a second object when animated with the 3D avatar.

In one or more implementations, the first object may be a soft body object.

In one or more alternative implementations, the first object may be a rigid body object.

Figure 7:
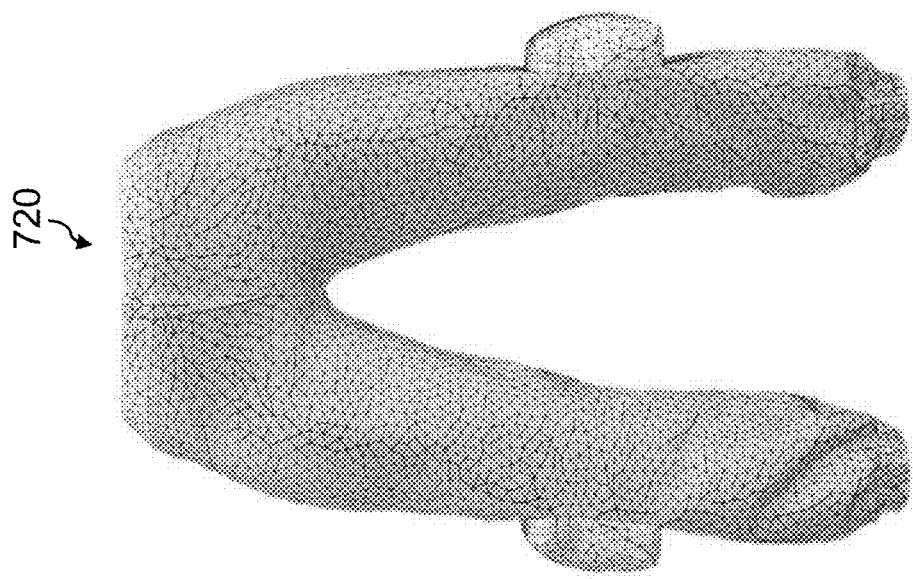
FIG. 7 shows a non-limiting example of a particular animation frame of a point cloud of a first object (pants) to be animated in accordance with one or more non-limiting embodiments of the present technology.

FIG. 7 shows a non-limiting example of a particular animation frame of a point cloud of a first object (pants) 720 to be animated.

The offline generation procedure 400 is configured to receive an indication of a second object.

In one or more implementations, the indication of the object may be received from the first client device 210 and may correspond to a selection of an element in a graphical user interface (GUI) on the first client device 210.

In one or more implementations, at least one of the first object and the second object are soft bodies, e.g., deformable objects. It should be understood that each of the first object and the second object may be soft bodies, only one of the first object and the second object may be a soft body and another one may be rigid body. In one or more alternative implementations, the first and second objects may be rigid bodies.

Each object is associated with respect object properties. The respective object properties may depend on the nature of the respective object.

In one or more implementations, for soft body objects, the properties may include one or more of young's modulus, Poisson's ratio, damping, mass density, collision margin, and restitution coefficient.

In one or more implementations, for soft body objects such as fabric, the properties may include fabric properties (warp/weft, elasticity), static and dynamic friction, and material density.

In one or more implementations, for rigid body objects, the properties may include one or more of mass, moment of inertia, restitution coefficient, friction coefficient, and collision margin.

Each object is associated with a respective set of constraints. The set of constraints includes a first set of constraints that will be used during the point cloud generation procedure 430, and a second set of constraints that will be used during the online object-object interaction simulation procedure 500. In some implementations, the first set of constraints is the same as the second set of constraints. In one or more other implementations, the first set of constraints may be different from the second set of constraints (e.g., the second set of constraints may include more constraints than the first set of constraints).

As a non-limiting example, the set of constraints may reflect or approximate the material properties of the object that may influence its movement with relation to the body of the 3D avatar, its movement with relation to other objects and its movement with relation to the environment in which the 3D avatar evolves. As a non-limiting example, the indication of the second object may correspond to a piece of garment to be worn by the 3D avatar, e.g., a piece of clothing having been selected or created by the user 205 of the first client device 210.

It will be appreciated that respective portions of the first object and the respective portions of the second object may interact when animated on the body of the 3D avatar.

The indication of the first object and the second object may be received at the same time or at different times.

Point Cloud Generation Procedure

The point cloud generation procedure 430 is configured to generate, for each respective object, based on the animation of the 3D avatar, a respective point cloud representing the respective object superposed on the 3D avatar for each time frame of the set of time frames of the animation.

The point cloud generation procedure 430 may be executed on a frame-by-frame based on the set of frames representing the movement of the body of the 3D avatar.

The point cloud generation procedure 430 is configured to generate, based on the indication of the first object, a first set of point clouds representing positions in time of the first object with respect to the body of the 3D avatar. In one or more implementations, the first object may be a piece of garment to be superposed on the 3D avatar.

In one or more implementations, the point cloud generation procedure 430 is configured to use a respective first set of constraints associated with the first object to generate the first set of point clouds. The first set of constraints may, as a non-limiting example, include distance constraints and volume constraints.

It should be understood that the first set of point clouds includes at least one first point cloud corresponding to a time frame.

The first point cloud is a collection of data points in a 3D coordinate system which represents the surface of the first object. The first object may be represented in the form of a mesh, where the vertices (i.e., points) are joined by edges (sides of polygons forming faces of the shapes). It will be appreciated that other types of representations may be possible.

The point cloud generation procedure 430 obtains, for the set of frames of the animation representing the movement of the body of the 3D avatar, a first set of point clouds, where each first point cloud corresponds to the first object superposed on the body of the 3D avatar for each frame of the set of frames.

Figure 8:
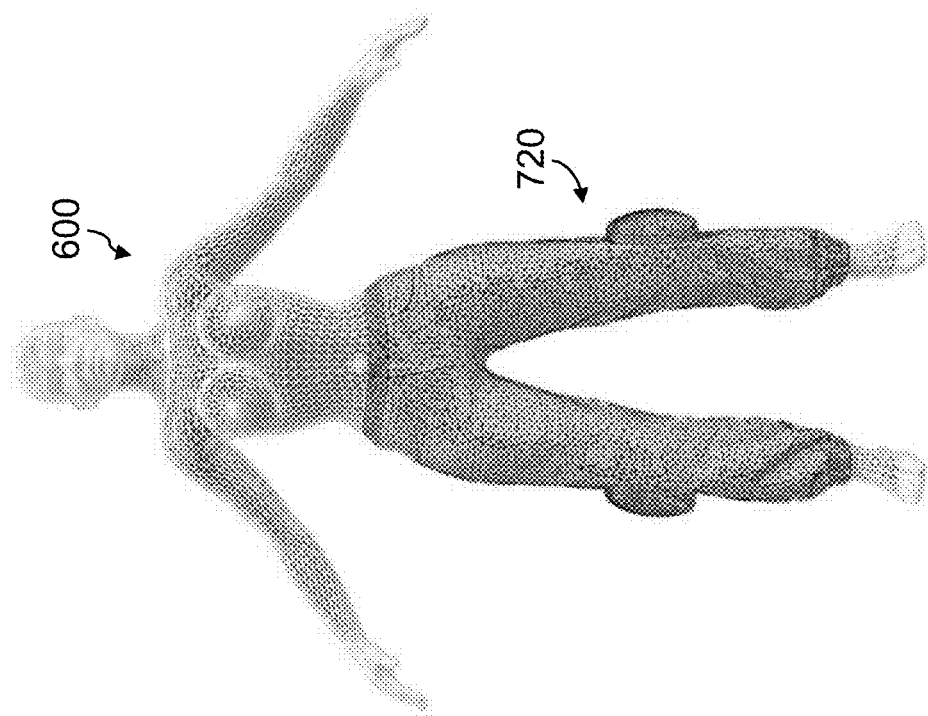
FIG. 8 shows a non-limiting example of the point clouds of pants ready to be simulated on the 3D avatar in accordance with one or more non-limiting embodiments of the present technology.

FIG. 8 shows a non-limiting example of the point clouds of pants 720 ready to be simulated on the 3D avatar 600.

Figure 9:
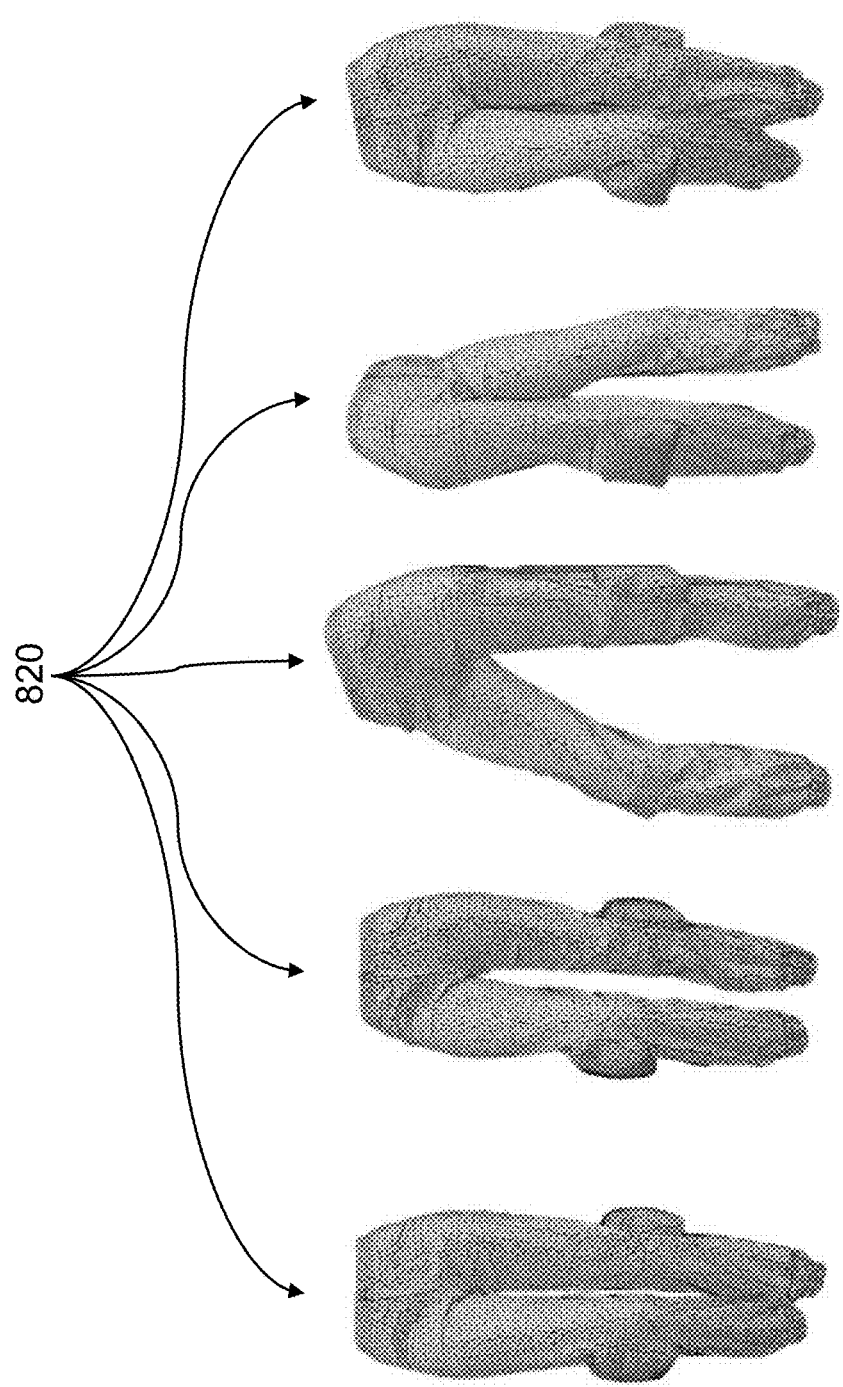
FIG. 9 shows non-limiting example of a first set of point clouds of the first object (pants) at various frames of the animation, each point cloud of the first set of point clouds representing a respective time frame of the animation.

FIG. 9 shows non-limiting example of a first set of point clouds 840 of the first object (pants) 820 at various frames of the animation, each point cloud (not separately numbered) of the first set of point clouds 840 representing a different time frame.

The point cloud generation procedure 430 is configured to generate, based on the indication of the second object, a second set of point clouds representing a movement over time of the second object with respect to the animation of the body of the 3D avatar.

In one or more implementations, the point cloud generation procedure 430 is configured to use a respective first set of constraints associated with the second object to generate the second set of point clouds. The first set of constraints may, as a non-limiting example, include distance constraints and volume constraints.

The second point cloud is a collection of data points in a 3D coordinate system which represents the surface of the second object on the body of the 3D avatar at a given moment in time.

Figure 10:
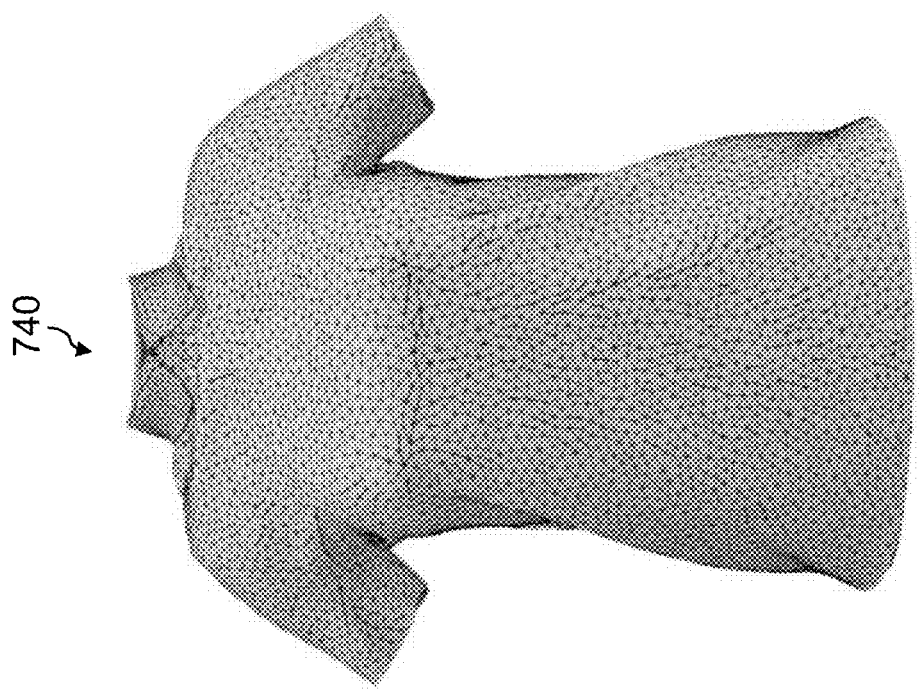
FIG. 10 shows a non-limiting example of a particular animation frame of a second point cloud of a second object (polo t-shirt) to be animated.

FIG. 10 shows a non-limiting example of a particular animation frame of a second point cloud of a second object (polo t-shirt) 740 to be animated.

Figure 11:
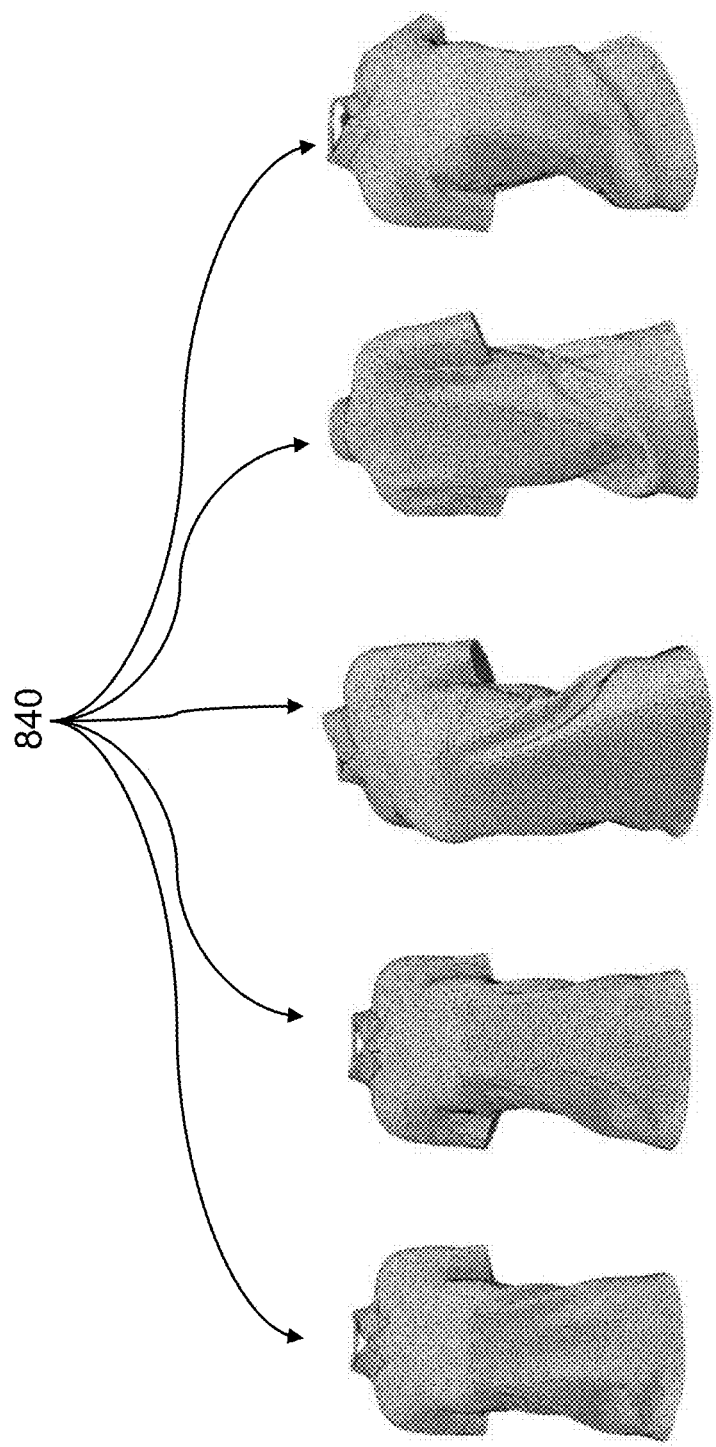
FIG. 11 shows non-limiting example of a second set of point clouds 840 of the second object (pants) at various frames of the animation, each point cloud (not separately numbered) of the second set of point clouds representing a different time frame.
Figure 13:
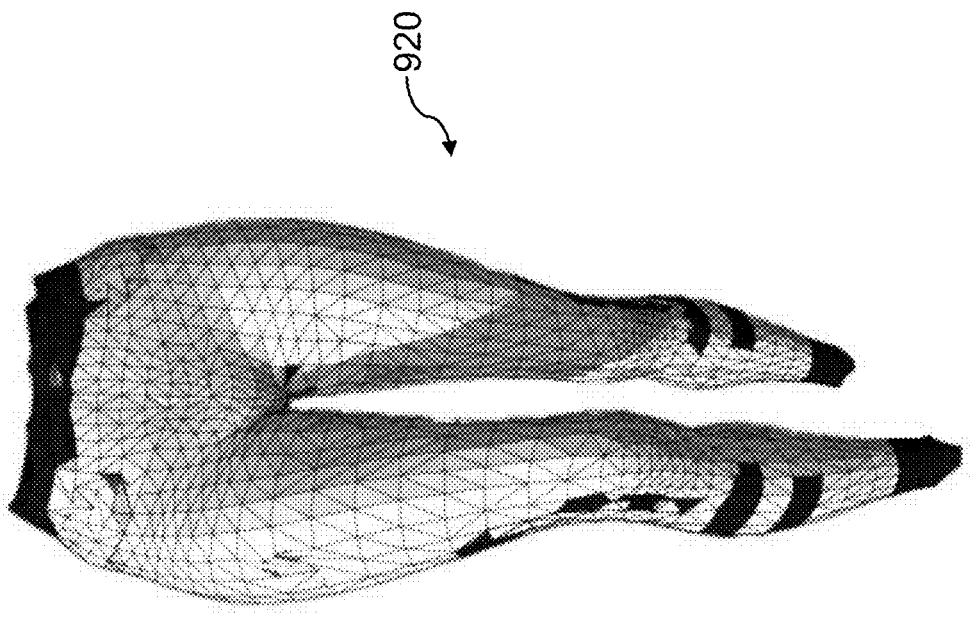
FIG. 13 shows a non-limiting example of the projected first object (pants) without the 3D avatar, the projected object (pants) having been obtained using implementations of the projection procedure in accordance with one or more non-limiting embodiments of the present technology.
Figure 12:
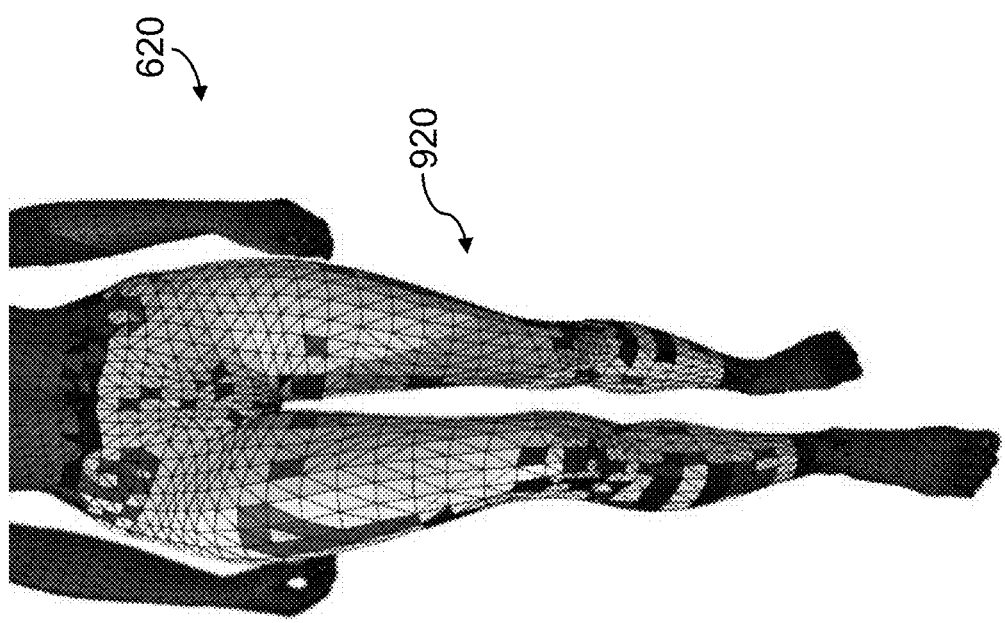
FIG. 12 shows a non-limiting example of the projected first object (pants) on the lower body of 3D avatar, the projected first object (pants) having been obtained using implementations of the projection procedure in accordance with one or more non-limiting embodiments of the present technology.

FIG. 11 shows non-limiting example of a second set of point clouds 840 of the second object (pants) 740 at various frames of the animation, each point cloud (not separately numbered) of the second set of point clouds 840 representing a different time frame.

It will be appreciated that the point cloud generation procedure 430 may be executed for more than two objects.

The point cloud generation procedure 430 is configured to output, for each object, respective point clouds which represents the respective object superposed individually in relation to the body of the 3D avatar.

In one or more implementations, the point cloud generation procedure 430 outputs, for each respective object, for each time frame of the animation of the 3D body avatar, a respective point cloud to obtain a respective set of point clouds per object.

Compression Procedure

The offline generation procedure 400 is configured to execute a compression procedure 440.

The purpose of the compression procedure 440 is to encode and/or compress each respective set of point clouds in order to reduce their size for storage and/or transmission to client devices executing the online object-object interaction simulation procedure 500. It will be appreciated that this enables minimizing storage and bandwidth consumption.

The compression procedure 440 has access to a set of compression algorithms 445. It should be noted that the compression procedure 440 may use one or more compression algorithms in the set of compression algorithms 445 to perform compression of point clouds.

Further, the compression procedure 440 may use one or more different compression algorithms from the set of compression algorithms 445 for each object, as long as the computing devices performing the online object-object interaction simulation procedure 500 receive an indication of the type of compression used to perform appropriate decompression of the compressed point clouds.

In one or more implementations, the set of compression algorithms 445 include one or more of geometric encoders, lossless data encoders and an artificial intelligence (AI) auto-encoders.

It will be appreciated that the compression algorithms 445 may be selected by operator(s) of the present technology based one or more factors such as desired compression ratio, encoding/decoding complexity, support for attributes beyond geometry (colors, normals, etc.), and the type of point cloud representation (raw points, voxels, octrees).

Non-limiting examples of geometric encoding algorithms include Geometric encoding algorithms include Signed Distance Function (SDF) encoding, occupancy networks, coordinate-based encoding, voxel-based encoding, point cloud encoding, and mesh-based encoding.

Non-limiting examples of lossless data encoders include one or more of octree-based encoding, transform-based encoding, graph transform encoding, LASzip and predictive lossless coding.

Non-limiting examples of artificial intelligence (AI) auto-encoders include one or more of neural networks and deep neural networks configured to auto-encode existing data.

The compression procedure 440 outputs, for each respective object, a respective compressed set of point clouds.

It will be appreciated that in implementations where data is streamed to the online object-object interaction simulation procedure 500, the compression procedure 440 may store the respective compressed set of point clouds such that specific compressed point clouds corresponding to respective time frames of the animation may be retrieved and transmitted upon request to be rendered in real-time by a client device during the online object-object interaction simulation procedure 500.

In one or more implementations, the compression procedure 400 stores the compressed set of point clouds in one or more databases such as the database 240.

In one or more implementations, the offline generation procedure 400 is configured to transmit each of the compressed set of point clouds to one or more computing devices executing a respective instance of the online object-object interaction simulation procedure 500. In one or more implementations, the offline generation procedure 400 is configured to transmit, over the communication network 250, the compressed set of point clouds to the first client device 210.

In one or more other implementations, the offline generation procedure 400 is configured to transmit, over the communication network 250, the respective compressed set of point clouds to the online object-object interaction simulation procedure 500, such as first client device 210 and to the second client device 220.

Online Object-Object Interaction Simulation Procedure

Figure 5:
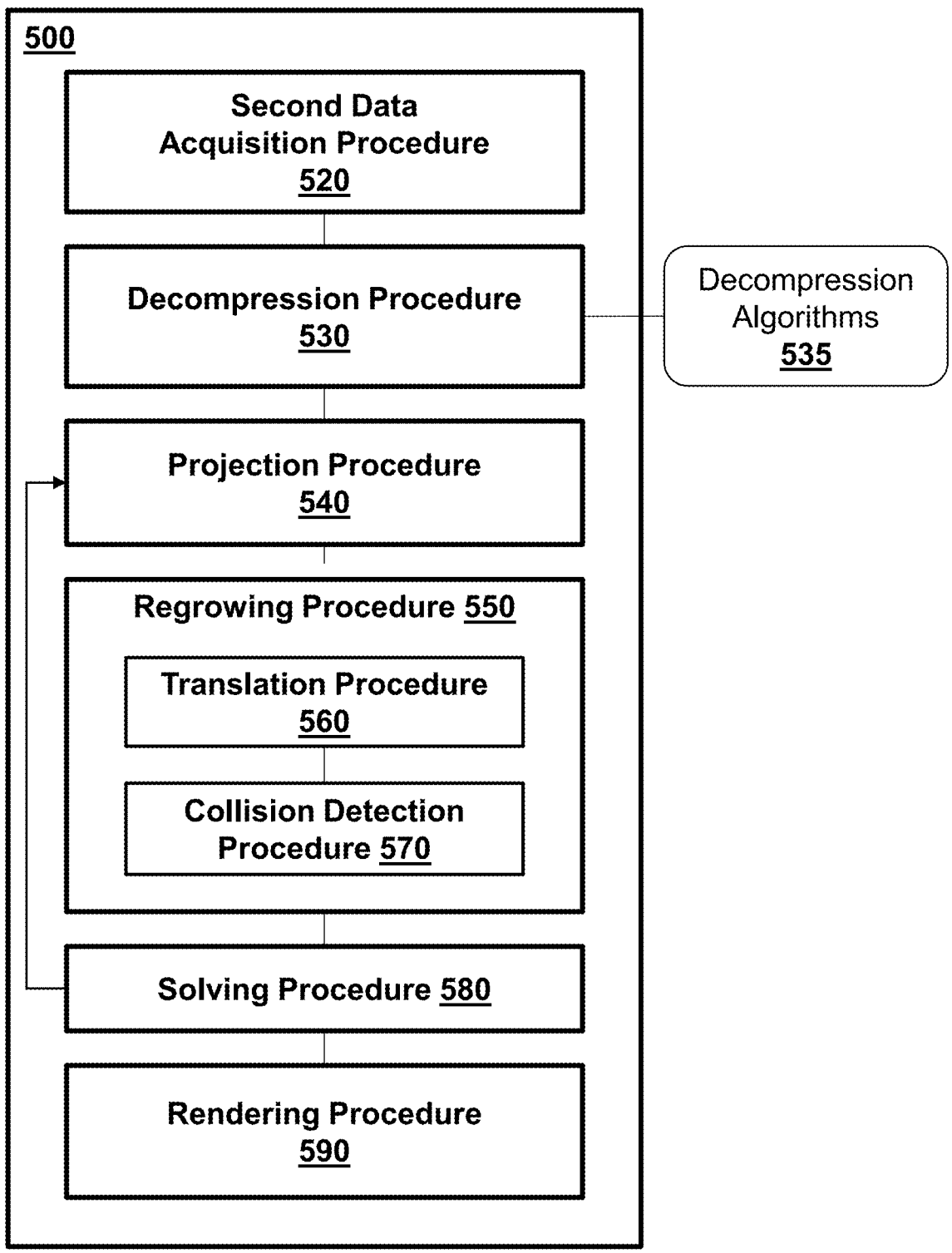
FIG. 5 illustrates a schematic diagram of an online object-object interaction simulation procedure in accordance with one or more non-limiting implementations of the present technology.

With reference to FIG. 5, there is shown a schematic diagram of an online object-object interaction simulation procedure 500 in accordance with one or more non-limiting implementations of the present technology.

The online object-object interaction simulation procedure 500 is executed after the offline generation procedure 400.

As described in the foregoing, the offline generation procedure 400 serves to generate compressed point clouds of individual objects which may interact with the body of the 3D avatar to be animated, and two or more objects may have been selected by a user 205, 215 via its respective client device 210, 220. The purpose of the online object-object interaction simulation procedure 500 is to generate physically realistic real-time frame-by-frame animations of the body of the 3D avatar by simulating physics states of interactions between two or more objects in proximity of the body according to the processing and memory capabilities of the computing device executing the online object-object interaction simulation procedure 500.

It will be appreciated that a plurality of instances of the offline generation procedure 400 may be executed by one or more processors for generating respective sets of point clouds representing respective objects animated with 3D avatar(s).

As a non-limiting example, the objects may be different pieces of clothing worn by the 3D avatar corresponding to different layers, e.g., underwear, socks, jeans, shirts, coat, hat, accessories, etc.

The online object-object interaction simulation procedure 500 is executed by at least one processor, which may be different from the at least one processor executing the offline generation procedure 400.

In one or more implementations, the online object-object interaction simulation procedure 500 is executed such that compressed point cloud data is streamed to the online object-object interaction simulation procedure 500, and the online object-object interaction simulation procedure 500 generates final point clouds frame-by-frame, which may be directly rendered.

The online object-object interaction simulation procedure 500 enables to generate frame-by-frame real-time animations on client devices, which requires minimal processing power. Further, the online object-object interaction simulation procedure 500 enables streaming data, thereby allowing arbitrarily long replays.

It will be appreciated that the number of pieces of objects interacting with the body of the 3D avatar received by the online object-object interaction simulation procedure 500 is not limited and may include two or more objects. In one or more alternative implementations, the online object-object interaction simulation procedure 500 may be executed for a single object animated with respect to the 3D avatar.

The online object-object interaction simulation procedure 500 comprises inter alia a second data acquisition procedure 520, a decompression procedure 530, a regrowing procedure 550, and optionally a rendering procedure 590.

Second Data Acquisition Procedure

The second data acquisition procedure 520 receives the compressed first set of point clouds. It will be appreciated that the first set of compressed point cloud includes at least one compressed first point cloud corresponding to a given time frame of the animation of the first object on the body of the 3D avatar.

In one or more implementations, the second data acquisition procedure 520 is configured to receive a set of constraints associated with the first object, i.e., the object located on a layer below the second object. The set of constraints may be a second set of constraints received during the first data acquisition procedure 420. It will be appreciated that the set of constraints may be received at any time before the regrowing procedure 550. The set of constraints for soft body objects such as clothes link different points of the first point clouds and the second point clouds. The set of constraints may include one or more of distance constraints, bending constraints, and volume constraints. It will be appreciated that distance constraints are indicative of the elasticity of the object, bending constraints are indicative of bendability of the material, and volume constraints are indicative of how the volume of the object is conserved.

The second data acquisition procedure 520 may receive the compressed first set of point clouds from a computing device having executed the offline generation procedure 400 such as the server 230 or from a storage device such as the database 240.

The second data acquisition procedure 520 receives the compressed second set of point clouds. In one or more implementations, the compressed second set of point clouds may be a compressed set of second point clouds representing the second object on the 3D avatar at different moments in time.

The second data acquisition procedure 520 may receive the compressed second point cloud from the same computing device having compressed and transmitted the first point cloud (e.g., the server 230), or from a different computing device (e.g., another server (not shown)).

Decompression Procedure

The decompression procedure 530 is configured to inter alia: (i) access a set of decompression algorithms 535; (ii) decompress, using the set of decompression algorithms 535, the compressed first set of point clouds to obtain the first set of point clouds; (iii) decompress, using the set of decompression algorithms 535, the compressed second set of point clouds to obtain the second set of point clouds.

In one or more implementations, the decompression procedure 530 has access to a set of decompression algorithms 535 associated with the set of compression algorithms 445 having been used to compress each of the compressed first set of point clouds and the compressed second set of point clouds during the online generation procedure 400.

As explained previously with respect to the compression procedure 440 of the offline generation procedure 400, the compression procedure 440 may use one or more of geometric encoders, lossless data encoders and an artificial intelligence (AI) auto-encoders, and the decompression procedure 530 may use the respective one or more of the geometric encoders, lossless data encoders and an artificial intelligence (AI) auto-encoders to perform decompression.

The decompression procedure 530 outputs the first set of point clouds and the second set of point clouds.

In implementations where there are more than two objects having been compressed, the decompression procedure 530 outputs a respective set of point clouds for each respective object.

The projection procedure 540, the regrowing procedure 550 and the solving procedure 580 are executed for each time frame of the animation of the body of the 3D avatar.

In one or more implementations, the projection procedure 540, the regrowing procedure 550 and the solving procedure 580 may be performed according to computing capabilities of the respective client device executing the regrowing procedure 550, e.g. the first client device 210 and the second client device 220. Different parameters may be used depending on the computing parameters (e.g., available memory) which may for example influence the number of frames per second (FPS) of the final animation of the 3D avatar with the first object and the second object interacting.

Projection Procedure

The projection procedure 540 is configured to inter alia project the first set of point clouds onto the animation of the body of the 3D avatar to obtain a first set of projected points over time representing the first object animated on the body of the 3D avatar. The projection procedure 540 may be executed with the regrowing procedure 550 and the solving procedure 580 for each frame of the animation.

It will be appreciated that the first object represents the object that is located on a layer below the second object.

As a non-limiting example, the first object may be pants and the second object may be a t-shirt, where the lower portion of the t-shirt is located above the pants. As another non-limiting example, one may simulate the first object as the t-shirt and the second object as the pants, where the upper portion of the pants may be located above the lower portion of t-shirt (i.e., t-shirt tucked-in the pants).

The projection procedure 540 maps points of the first point cloud representing the first object on each frame representing the position of the body of the 3D avatar at a respective moment in time. The projection procedure 540 thus obtains, for each frame, a respective first projected point clouds which represent a surface of the first object on the body of the 3D avatar for the animation frame.

The projection procedure 540 maps, for each frame, the respective first point cloud, which represents the first object as a collection of points in a 3D coordinate system, onto the coordinate system of the animation of the body 3D avatar to obtain the respective first projected point cloud.

Each respective projected point cloud in the first set of projected point clouds corresponds to a respective frame of the animation of the movement of the body of the 3D avatar.

Figure 14:
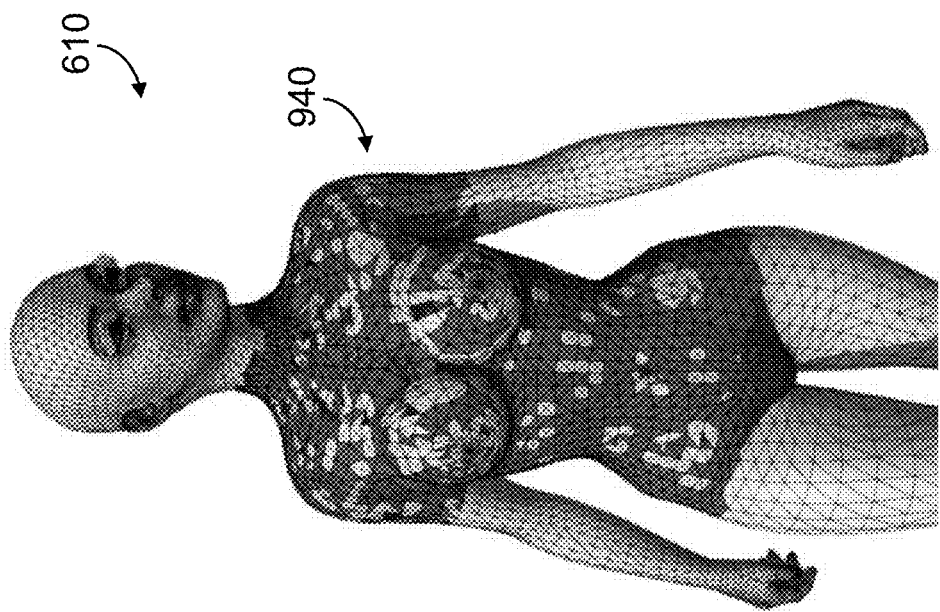
FIG. 14 shows a non-limiting example of the projected object (shirt) on the upper body of a 3D avatar, the projected object (shirt) having been obtained using implementations of the projection procedure in accordance with one or more non-limiting embodiments of the present technology.

FIG. 14 shows a non-limiting example of the projected first object (pants) 9420 on the lower body 620 of 3D avatar 600, the projected first object (pants) 920 having been obtained using implementations of the projection procedure 540.

Figure 15:
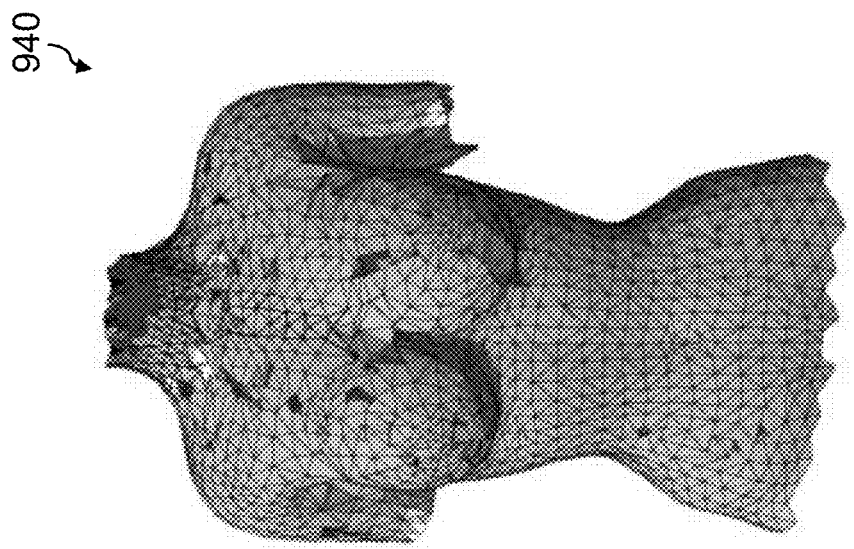
FIG. 15 shows a non-limiting example of the projected object (shirt) without the 3D avatar, the projected second object (shirt) having been obtained using implementations of the projection procedure in accordance with one or more non-limiting embodiments of the present technology.

FIG. 15 shows a non-limiting example of the projected first object (pants) 920 without the 3D avatar, the projected object (pants) 940 having been obtained using implementations of the projection procedure 540.

Figure 16:
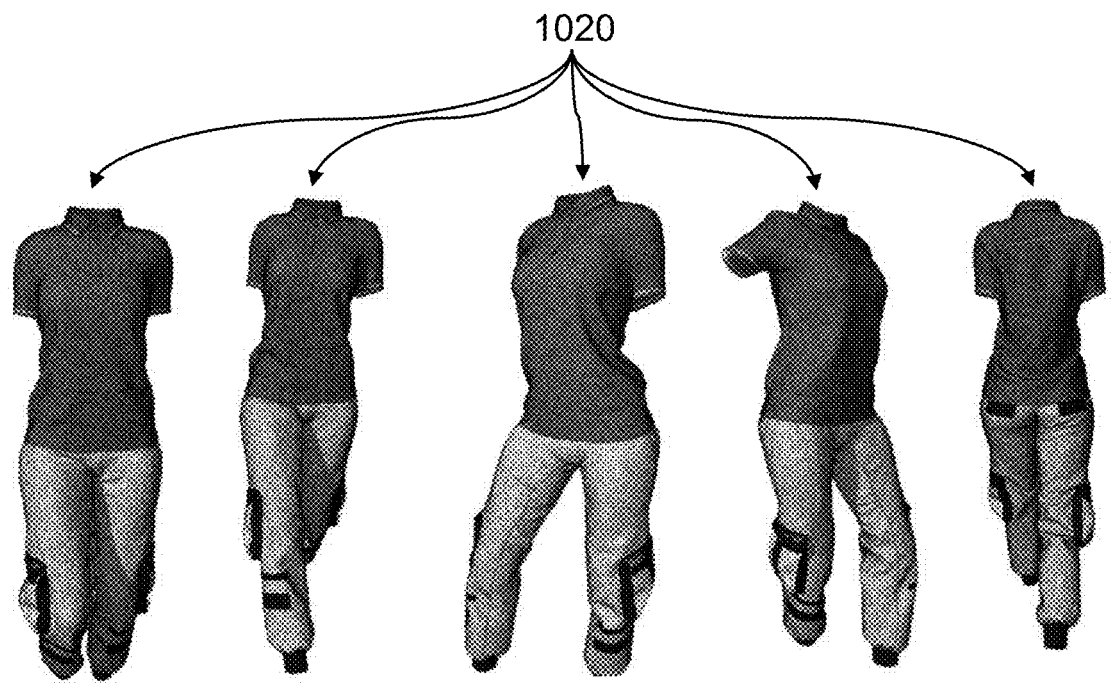
FIG. 16 shows a non-limiting example of the projected object (shirt) 940 on the upper body of 3D avatar, the projected object (shirt) having been obtained using implementations of the projection procedure in accordance with one or more non-limiting embodiments of the present technology.

FIG. 16 shows a non-limiting example of the projected object (shirt) 940 on the upper body 620 of 3D avatar 600, the projected object (shirt) 940 having been obtained using implementations of the projection procedure 540.

Figure 17:
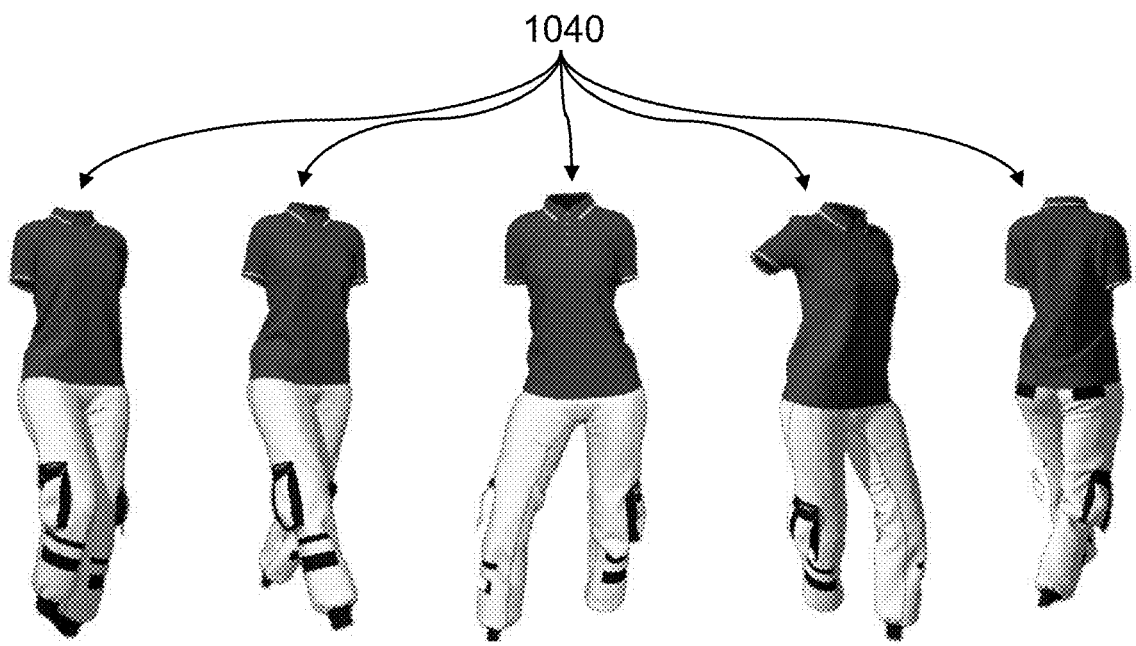
FIG. 17 shows a non-limiting example of a final rendering of the plurality of frames of animation of the second object (shirt) over the first object (pants) without the 3D avatar obtained by using implementations of the rendering procedure in accordance with one or more non-limiting embodiments of the present technology.

FIG. 17 shows a non-limiting example of the projected object (shirt) 940 without the 3D avatar, the projected second object (shirt) 940 having been obtained using implementations of the projection procedure 540.

Regrowing Procedure

The regrowing procedure 550 is configured to inter alia move projected points in the projected first point cloud towards corresponding points in the first point cloud at a given time frame and detect if there are collisions between the translated projected points and the second point cloud of the second object to obtain a regrown point cloud. The regrown point cloud will then be solved by the solving procedure 580 using the set of constraints associated with the first object to obtain a final point cloud for the time frame.

The regrowing procedure 550 and the solving procedure 580 are executed iteratively on a frame-by-frame basis.

The regrowing procedure 550 and the solving procedure 580 enable enhancing the realism, interactivity, and feedback of the animation of the 3D avatar with the first and second object interacting.

The regrowing procedure 550 comprises a translation procedure 560 and a collision detection procedure 570.

The translation procedure 560 is configured to receive the first set of projected point clouds, each respective first projected point cloud of the first set of projected point clouds corresponding to a respective frame of the animation of the 3D avatar with the first object.

The translation procedure 560 is configured to receive the first set of point clouds, each respective first point cloud corresponding to a respective frame of the animation of the moving body of the 3D avatar with the first object.

During the translation procedure 560, each projected point in the first projected point cloud is translated or moved towards its original corresponding destination in the first point cloud.

In one or more implementations, the translation procedure 560 is configured to interpolate the positions of the points in the projected first point cloud to corresponding positions in the first point cloud for a given time frame.

It will be appreciated that different methods may be used by the translation procedure 560 to translate the projected first point to corresponding locations in the first point cloud. Non-limiting examples of methods that may be used to move points may include interpolation and ray casting.

The purpose of the collision detection procedure 570 is to determine when and where the points of the first point cloud collide with second point cloud of the first object, and how they react to the impact. The collision detection procedure 570 is configured to determine intersections between geometries associated with the first and second objects, generating appropriate collision information such as collision points, normals and penetration depths, which will be recorded in the regrown point cloud.

It will be appreciated that the collision detection procedure 570 enables avoiding avoid unrealistic or impossible scenarios, such as objects passing through each other by taking into account constraints.

When the translation procedure 560 translates a projected first point of the first projected point cloud to a corresponding location in the first point cloud, the collision detection procedure 570 is configured to detect if the translated projected point intersects with one or more locations in the second point cloud or not.

If the translated projected point intersects with the second point cloud, the collision detection procedure 570 adds the intersection point in the regrown point cloud.

It will be appreciated that the translated projected point may intersect at more than one location with the second point cloud, as a non-limiting example if the second point cloud comprises a concave surface. In such scenarios, the collision detection procedure 570 determines the set of intersections with the second point cloud, and selects the intersection in the set of intersections having a minimum distance with the translated projected point.

In one or more implementations, the collision detection procedure 570 is configured to take into account appropriate collision response between the first object and the second object, which may as a non-limiting example include bouncing, sticking or merging.

If the collision detection procedure 570 detects an intersection (i.e., collision), the collision detection procedure 570 registers or adds the intersection point to the regrown point cloud.

If the collision detection procedure 570 does not detect an intersection, the collision detection procedure 570 registers the corresponding given point in the first point cloud in the regrown point cloud.

The number of points in the regrown point cloud correspond to the number of points of the first projected point cloud.

The collision detection procedure 570 is executed for each point in the projected point cloud translated towards the corresponding point in the first point cloud to obtain a regrown point cloud. Each respective regrown point cloud corresponds to a respective frame of the animation. The regrown point cloud is provided to the solving procedure 580.

The purpose of the solving procedure 580 is to interpret the laws of physics, such as conservation of energy and momentum by approximating the laws of physics to increase performance and obtain physically realistic motions of the first object and the second object according to the constraints.

The solving procedure 580 receives the set of constraints that will be used to solve the regrown point cloud to obtain a final point cloud. The set of constraints for soft body objects such as clothes link different points of the first point clouds and the second point clouds. The set of constraints may include one or more of distance constraints, bending constraints, and volume constraints. It will be appreciated that distance constraints are indicative of the elasticity of the object, bending constraints are indicative of bendability of the material, and volume constraints are indicative of how the volume of the object is conserved.

The solving procedure 580 is configured to use the set of constraints to calculate solutions to the regrown point cloud, which includes points having collided with the second object and points not having collided with the second object. The solving procedure 580 thus aims to correct the positions of the points in the regrown point cloud to obtain physically plausible positions that respect the set of constraints for the first object, thereby enhancing the realism of the animation.

It will be appreciated that the solving procedure 580 may use any method that enables solving the regrown point cloud by taking into account the constraints in real-time.

In one or more implementations, the solving procedure 580 is configured to use numerical methods to solve the constraints associated with the regrown point cloud.

The solving procedure 580 generally discretizes the motion of objects by using time-stepping to simplify and linearize the equations to obtain approximate solutions. The solving procedure 580 may execute a plurality of solving iterations to obtain the solution to the set of constraints associated with the regrown point cloud. During each time step of the solving iterations, the motion of the portions of the first object involved according to the constraints are linearly approximated.

In one or more implementations, the solving procedure 580 performs optimization under constraints until convergence. In one or more implementations, the solving procedure 580 solves the set of constraints with the regrown point cloud iteratively using the Gauss-Seidel method.

The solving procedure 580 performs a plurality of solving iterations until a criterion is met (e.g., convergence) to obtain a final point cloud of the first object for the respective time frame.

In some implementations, the solving procedure 580 is configured to provide the solved regrown point clouds as the final point clouds. The solved regrown point cloud represents a position of the first object on the body of the 3D avatar under the influence of the second object for a respective time frame.

In one or more implementations, the solving procedure 580 performs smoothing of the solved regrown point cloud to obtain the final point cloud for each time frame.

In one or more implementations, the solving procedure 580 provides the final point cloud representing a time frame to the rendering procedure 590.

Figure 18:
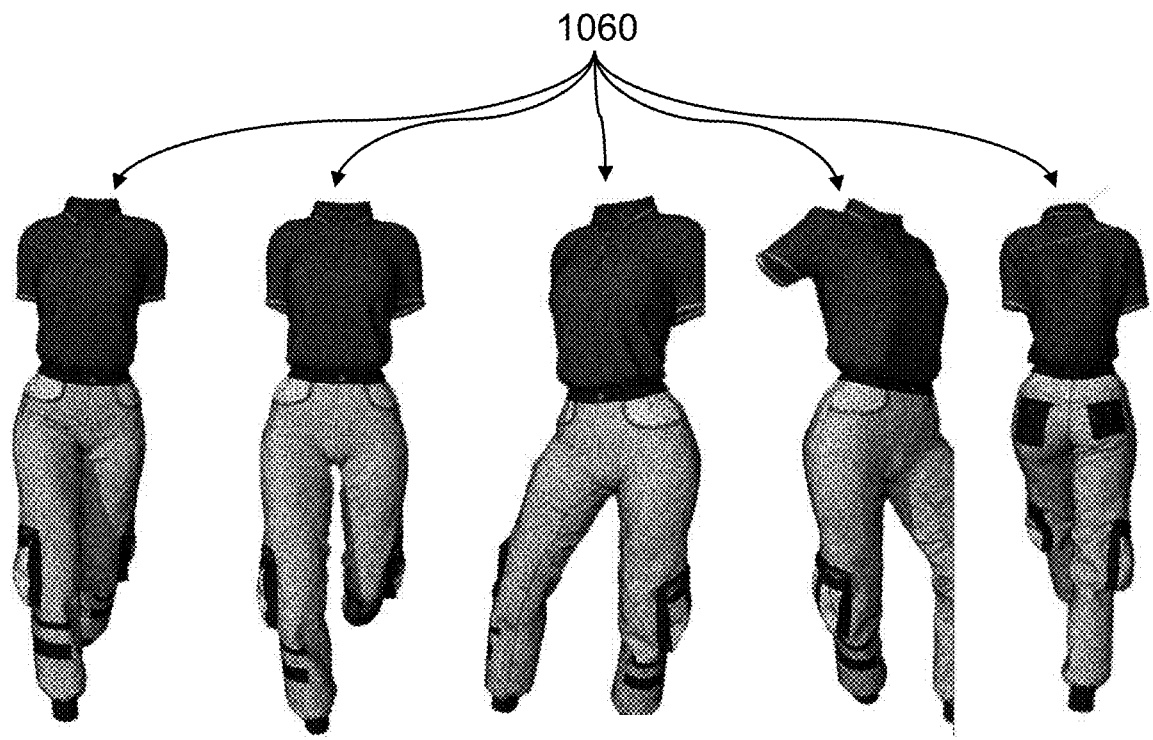
FIG. 18 shows a non-limiting example of a first set of final point clouds of the first object (pants) over the second object (shirt) without the 3D avatar obtained by using implementations of the solving procedure in accordance with one or more non-limiting embodiments of the present technology.

FIG. 18 shows a non-limiting example of a first set of final point clouds 1020 at different time frames of the second object (shirt) over the first object (pants) without the 3D avatar obtained by using implementations of the solving procedure 580.

FIG. 20 shows a non-limiting example of a first set of final point clouds 1060 with the first object (pants) over the second object (shirt) without the 3D avatar obtained by using implementations of the solving procedure 580.

Rendering Procedure

The rendering procedure 590 is configured to inter alia: (i) receive the final point cloud, the corresponding second point cloud and the corresponding frame of the animation of the body of the 3D avatar; (ii) render the final point cloud, the corresponding second point cloud and the corresponding frame of the animation of the body of the 3D avatar to obtain an animation frame of the body of the 3D avatar with the first and second objects.

In one or more implementations, the rendering procedure 590 is executed by a client device such as the first client device 210 and/or the second client device 220.

In one or more implementations, the rendering procedure 590 calculates normal, binormals and tangents of each point of the final point cloud to render a given time frame. It will be appreciated that this enables rendering the points as surfaces.

In one or more implementations the rendering procedure 590 is configured to use triangle rasterization to perform rendering. In one or more alternative implementations, the rendering procedure 590 may employs techniques such as point splatting, depth sorting, and level-of-detail (LoD) culling, path tracing, ray tracing. The rendering procedure 590 may have access to and use software components such as computer shaders, efficient point cloud data structures (e.g., octrees, BVHs), and vertex/geometry shaders to perform rendering.

In one or more implementations, the rendering procedure 590 is performed for each time frame of the respective final point cloud as it is received by the solving procedure 580.

In one or more implementations, the rendered frame of the final animation of the 3D avatar with the first object and the second object and their interaction is provided to be displayed on a display interface, such as screen 190 of computing device 100.

Figure 19:
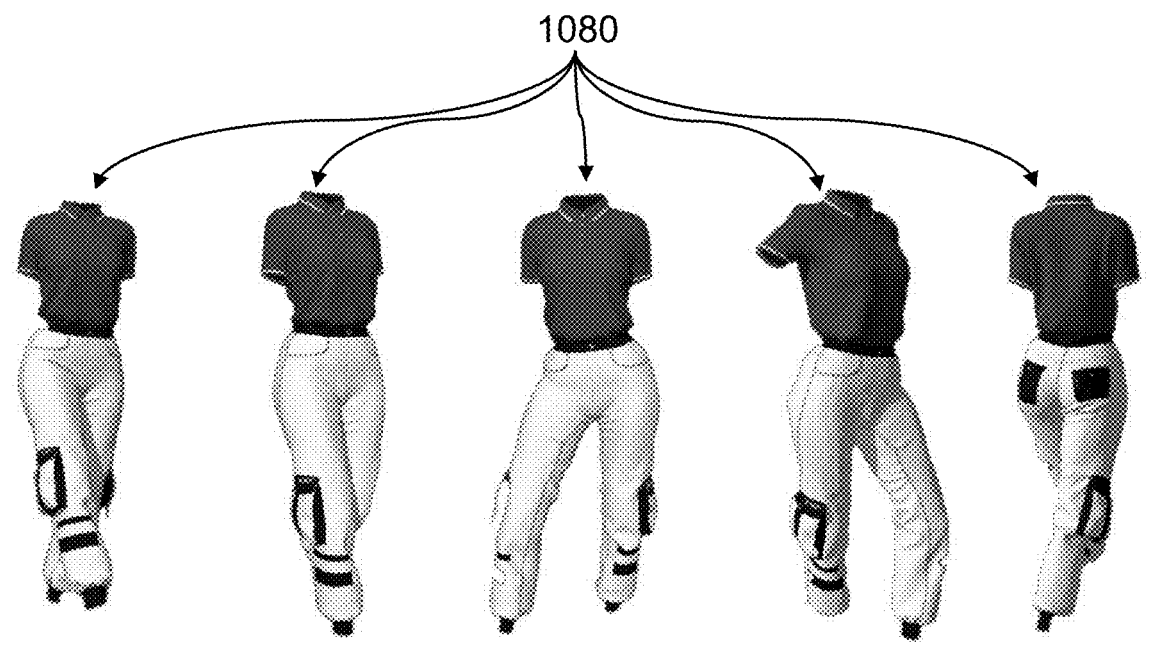
FIG. 19 shows a non-limiting example of a final rendering of the plurality of frames of animation 1080 of the first object (pants) over the regrown second object (shirt) without the 3D avatar obtained by using implementations of the rendering procedure in accordance with one or more non-limiting embodiments of the present technology.

FIG. 19 shows a non-limiting example of a final rendering of the plurality of frames 1040 of animation of the second object (shirt) over the first object (pants) without the 3D avatar obtained by using implementations of the rendering procedure 590.

Figure 21:
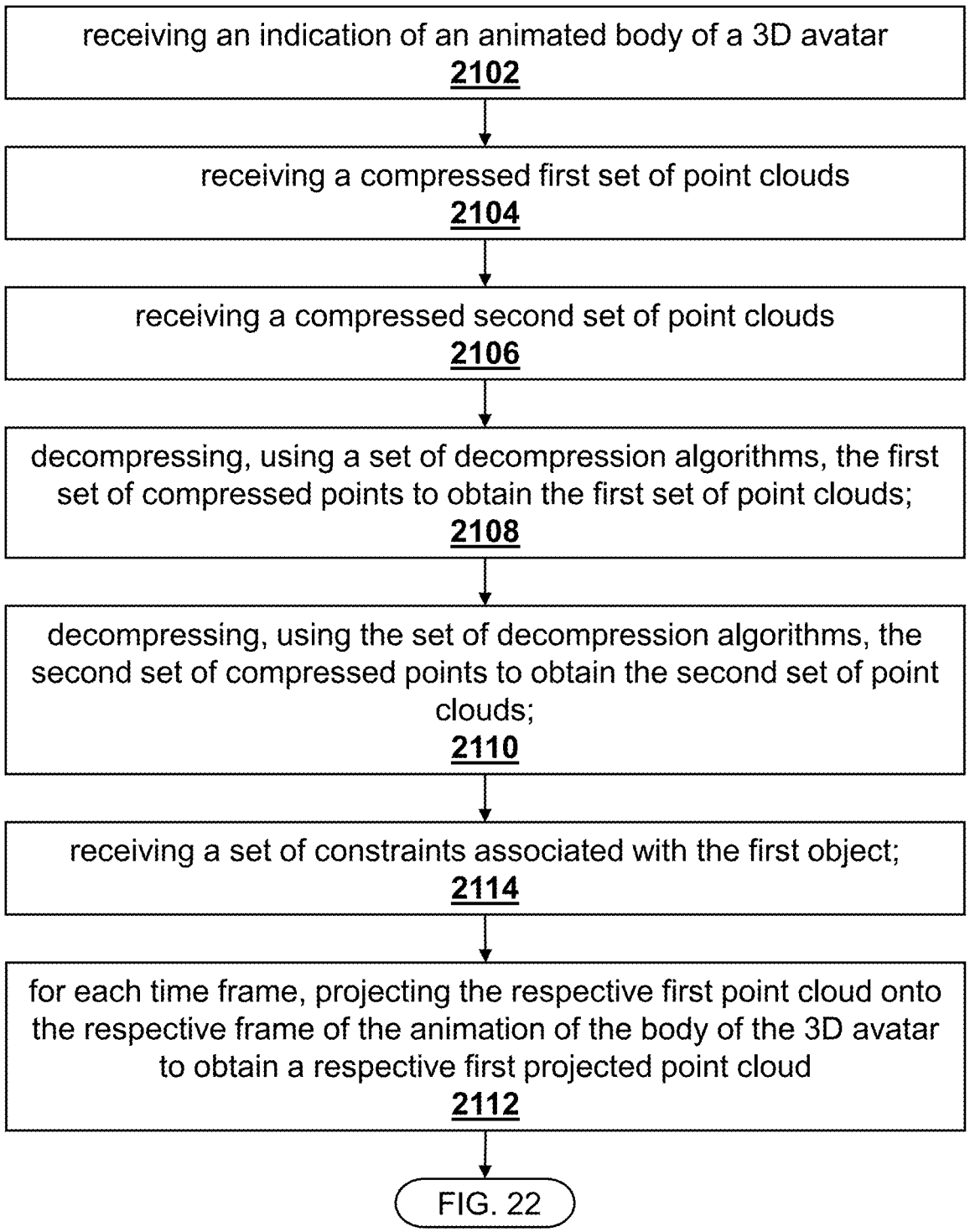

FIG. 21 shows a non-limiting example of a final rendering of the plurality of frames of animation 1080 of the first object (pants) over the second object (shirt) without the 3D avatar obtained by using implementations of the rendering procedure 590.

The projection procedure 540, the regrowing procedure 550, the solving procedure 580 and the rendering procedure 590 are repeated for each time frame of the set of time frames of the animation of the body of the 3D avatar, which enables rendering an animation of the body of the 3D avatar with the first object and the second object interacting in real-time.

Method Description

FIG. 22 illustrates a flowchart of a method 2000 of generating compressed point clouds of objects to be animated in accordance with one or more non-limiting implementations of the present technology.

In one or more implementations, the method 2000 is executed offline. In one or more implementations, the method 2000 may be executed by a server such as the server 230.

In one or more implementations, the server 230 comprises at least one processor such as the processor 110 and/or the GPU 111 operatively connected to at least one non-transitory computer readable storage medium such as the solid-state drive 120 and/or the random-access memory 130 storing computer-readable instructions thereon. The at least one processor, upon executing the computer-readable instructions, is configured to or operable to cause execution of the method 2000.

The method 2000 begins at processing step 2002.

At processing step 2002, the at least one processor receives an indication of an animated body of a 3D avatar.

In one or more implementations, the indication of the animation of the 3D avatar comprises respective positions of the body of the 3D avatar for a set of time frames.

At processing step 2004, the at least one processor receives an indication of a first object to be animated in relation to the body of the 3D avatar.

In one or more implementations, the first object may be one of a soft body object and a rigid body object associated with respective object properties and respective constraints.

At processing step 2006, the at least one processor receives an indication of a second object to be animated in relation to the body of the 3D avatar.

In one or more implementations, the second object may be one of a soft body object and a rigid body object associated with respective object properties and respective constraints.

At processing step 2008, the at least one processor generates, based on the indication of the animated body of the 3D avatar and the indication of the first object, a first set of point clouds representing respective positions of the first object to be animated in relation to the body of the 3D avatar.

Each first point cloud in the first set of point clouds represents positions of the first object on the body of the 3D avatar for a respective time frame of the set of time frames.

At processing step 2010, the at least one processor generates, based on the indication of the animated body of the 3D avatar and the indication of the second object, a second set of point clouds representing the respective positions of the second object to be animated in relation to the body of the 3D avatar.

Each second point cloud in the second set of point clouds represents positions of the second object on the body of the 3D avatar for a respective time frame of the set of time frames.

At processing step 2012, the at least one processor compresses, using a set compression algorithm, the first set of point clouds to obtain a compressed first set of point clouds and the second set of point clouds to obtain a compressed second set of point clouds.

The at least one processor may use a respective one or more compression algorithms in the set of compression algorithms to compress each of the first set of point clouds and the second set of point clouds. It should be understood that the at least one processor may perform the compression of the first set of point clouds and the second set of point clouds at a different time.

At processing step 2014, the at least one processor transmits the compressed first set of point clouds and the compressed second set of point clouds.

In one or more implementations, the at least one processor transmits the compressed first set of point clouds and the compressed second set of point clouds to at least one of the first client device 210 and the second client device 220. In one or more other implementations, the at least one processor transmits the compressed first set of point clouds and the compressed second set of point clouds to a storage device, such as the database 240.

The method 2000 then ends.

The method 2000 may be executed individually for each object that may be animated with a 3D avatar. Further, it should be understood that the method 2000 may be executed individually for each time frame of the animation, or may be executed individually for a plurality of time frames of the animation.

FIGS. 21 and 22 illustrate a flowchart of a method 2100 of performing online generation of object-object interaction with respect to the body of the 3D avatar in accordance with one or more non-limiting implementations of the present technology.

In one or more implementations, the method 2100 is executed online and in real-time. In one or more implementations, the method 2100 is executed by a client device such as the first client device 210 and/or the second client device 220. It should be understood that the method 2100 may be executed at any time after the method 2000, i.e., after set of point clouds of individual objects in relation to the 3D avatar have been generated and compressed.

In one or more implementations, the first client device 210 and/or the second client device 220 comprise at least one processor such as the processor 110 and/or the GPU 111 operatively connected to a non-transitory computer readable storage medium such as the solid-state drive 120 and/or the random-access memory 130 storing computer-readable instructions thereon. The at least one processor, upon executing the computer-readable instructions, is configured to or operable to execute the method 2100.

The method 2100 begins at processing step 2102.

At processing step 2102, the at least one processor receives an indication of animated body of a 3D avatar.

In one or more implementations, the at least one processor may transmit a request to a computing device and/or storage medium, and in response to the request, may receive the indication of the animation of the body of the 3D avatar. In one or more implementations, the request may include one or more respective computing parameters or desired animation parameters (e.g., resolution and/or FPS), and in response thereto the at least one processor may receive the indication of the animation of the body of the 3D avatar. The animation of the body of the 3D avatar comprises positions of the body of the 3D avatar for a set of time frames.

At processing step 2104, the at least one processor receives a first set of compressed point clouds, representing a first object animated in relation to the body of the avatar, the first set of compressed point clouds having been generated and compressed offline.

In one or more implementations, the at least one processor may receive the first set of compressed point clouds in response to a request. The first set of compressed point clouds may include at least one compressed first point cloud corresponding to a respective time frame of the set of time frames.

At processing step 2106, the at least one processor receives a compressed second set of point clouds representing a second object animated in relation to the body of the avatar, the second object being located on a layer above the first object, the compressed second set of point clouds having been generated and compressed offline.

In one or more implementations, the at least one processor may receive the second set of compressed point clouds in response to a request. The second set of compressed point clouds may include at least one second compressed point cloud corresponding to a respective time frame of the set of time frames.

It will be appreciated that processing steps 2102, 2104, and 2106 may be executed in any sequence or at the same time.

At processing step 2108, the at least one processor decompresses, using a set of decompression algorithms, the compressed first set of point clouds to obtain the first set of point clouds.

Each respective first point cloud of the first set of point clouds corresponds to a respective frame of the first object animated with respect to the body of the 3D avatar. The first set of point clouds includes at least one first point cloud. The first set of point clouds represents the first object in relation to the body of the 3D avatar, the first object being in contact with the body of the 3D avatar.

In one or more implementation, the first object may be a piece of garment worn by the 3D avatar that will be located on a layer below one or more other objects such as for example other pieces of garments and accessories.

At processing step 2110, the at least one processor decompresses, using the set of compression algorithms, the compressed second set of point clouds to obtain the second set of point clouds.

Each respective second point cloud of the second set of point clouds corresponds to a respective frame of the second object animated with respect to the body of the 3D avatar. The second set of point clouds includes at least one second point cloud. The second set of point clouds represents the second object in relation to the body of the 3D avatar, the second object being located on a layer above the first object with respect to the body of the 3D avatar.

At processing step 2112, the at least one processor receives a set of constraints associated with the first object.

In one or more implementations, the set of constraints correspond to physical constraints that will be used to simulate the interactions between the first object and the second object on the animation of the body of the 3D avatar. The set of constraints may include but are not limited to distance and bending constraints of the first object.

Processing steps 2114 to processing step 2125 may be performed for each time frame of the animation of the body of the 3D avatar.

At processing step 2114, for each time frame, the at least one processor projects the respective first point cloud onto the respective frame of the animation of the body of the 3D avatar to obtain a respective first projected point cloud.

At processing step 2116, for each time frame, the at least one processer regrows the respective projected point cloud to obtain a regrown point cloud, said regrowing comprising processing steps 2118 to 2124.

At processing step 2118, for each time frame, the at least one processor moves the given projected point in the respective first projected point cloud towards a corresponding given first point in the first point cloud.

At processing step 2120, for each time frame, the at least one processor determines if the given translated projected point in the respective first projected point cloud intersects with the second point cloud. If there is one or more intersections, the at least one processor executes processing step 2122. If there is no intersection the at least one processor executes processing step 2124.

At processing step 2122, if the given translated projected point intersects with the second point cloud, the at least one processor determines a selected intersection point and adds the selected intersection point in the regrown point cloud.

In one or more implementations, the given translated projected point may intersect at a plurality of intersection points with the second point cloud. The at least one processor may calculate the distances between each intersection points and the given translated projected point and may select an intersection point having the shortest distance to be added to the regrown point cloud.

At processing step 2124, if the given translated projected point does not intersect with the second point cloud, the at least one processor adds the corresponding given first point to the regrown point cloud.

It will be appreciated that processing steps 2118 to 2122 or 2124 are repeated for each point in the first projected first point cloud.

The at least one processor obtains a regrown point cloud, the regrown point cloud having the same number of points as the projected first point cloud. The regrown point cloud comprises points intersecting (i.e., colliding) with the second point cloud and points not intersecting with the second point cloud.

At processing step 2126, for each time frame, the at least one processor solves, using the set of constraints associated with the first object, the respective regrown point cloud to obtain a final point cloud.

In one or more implementations, the at least one processor may perform solving using any numerical method that enables solving the system of constraints in real-time. In one or more implementations, the at least one processor may use the Gauss-Siedel method. It will be appreciated that the at least one processor may perform a plurality of solving iterations until converge.

In one or more implementations, the at least one processor performs smoothing of the regrown point cloud to obtain the final point cloud.

In some implementations, method 2100 may end at step 2126. In one or more implementations, the method 2100 may continue to step 2128.

At processing step 2128, for each time frame, the at least one processor renders the final point cloud with a corresponding frame of the second point cloud and of the animation of the 3D avatar to obtain a respective frame of the final animation.

In one or more implementations, prior to executing processing step 2128, the at least one processor calculates normal, binormals and tangents of each point in the final point cloud and outputs the final point cloud with comprising normal, binormals and tangents associated with each point the final point cloud.

In one or more implementations, the at least one processor transmits the respective frame of the animation to be displayed on a display device such as a display screen of the client devices 210, 220.

It will be appreciated that the method 2100 may be executed in real-time to provide final point clouds that will be rendered into a respective time frame of the final animation of the body of the 3D avatar with the first object and the second object interacting.

The method 2100 then ends.

It will be appreciated that implementations of the method 2100 enables generating frame-by-frame real-time animations of the body of the 3D avatar with the first and second object by modeling the interaction between the first object and the second object in a physically accurate manner at run time on client devices, which requires minimal processing power. By pre-computing animations of individual objects with respect to the animation of the body of the 3D avatar and compressing generated point cloud data using the method 2000, the method 2100 may be executed at run-time on client devices, thereby enabling generating animations of interactions of clothes, streaming frames and arbitrarily long replays.

It should be expressly understood that not all technical effects mentioned herein need to be enjoyed in each and every implementation of the present technology. For example, implementations of the present technology may be implemented without the user enjoying some of these technical effects, while other non-limiting implementations may be implemented with the user enjoying other technical effects or none at all.

Some of these steps and signal sending receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting.

What is claimed is:

1. A method for performing a simulation of interactions of objects in relation to a 3D avatar in real-time, the method being executed by at least one processor, the method comprising: during an online processing phase:
   receiving an animation of a body of a 3D avatar, the animation comprising a set of frames, each frame representing a respective position of the body of the 3D avatar in time; receiving a compressed first set of point clouds representing a first object animated in relation to the body of the 3D avatar, the compressed first set of point clouds having been generated and compressed offline;
   receiving a compressed second set of point clouds representing a second object animated in relation to the body of the 3D avatar, the second object being located on a layer above the first object, the compressed second set of point clouds having been generated and compressed offline;
   decompressing, using a set of decompression algorithms, the first set of compressed point clouds to obtain a first set of point clouds, each respective first point cloud corresponding to a respective frame of the set of frames; decompressing, using the set of decompression algorithms, the second set of compressed point clouds to obtain a second set of point clouds, each respective second point cloud corresponding to a respective frame of the set of frames; receiving a set of constraints associated with the first object;
   for each respective frame of the set of frames: projecting the respective first point cloud onto the respective frame of the animation of the body of the 3D avatar to obtain a respective first projected point cloud; regrowing the first projected point cloud to obtain a regrown point cloud, said regrowing comprising, for each given projected point in the first projected point cloud:
   translating the given projected point in the respective first projected point cloud towards a corresponding given first point in the first point cloud;
   determining if the given translated projected point in the respective first projected point cloud intersects with the second point cloud; if the given translated projected point intersects with the second point cloud:
   determining and adding a selected intersection point to the regrown point cloud; and if the given projected point does not intersect with the corresponding second given point: adding the corresponding given first point to the regrown point cloud; solving, using the set of constraints associated with the first object, the respective regrown point cloud to obtain a final point cloud; and outputting the respective final point cloud, the respective final point cloud representing a respective frame of a final animation of the first object interacting with the second object on the body of the 3D avatar, the respective final point cloud to be rendered.

2. The method of claim 1, further comprising:
   rendering the respective final point cloud with the respective second point cloud and a respective frame of the animation of the body of the 3D avatar.

3. The method of claim 1, further comprising, prior to said receiving the animation of the body of the 3D avatar, during an offline processing phase: receiving the animation of a body of a 3D avatar, the animation comprising a set of frames, each frame representing a respective position of the body of the 3D avatar in time; receiving an indication of the first object to be animated in relation to the body of the 3D avatar;
   receiving an indication of a second object to be animated in relation to the body of the 3D avatar;
   generating, based on the indication of the animated body of the 3D avatar and the indication of the first object, a first set of point clouds representing the first object animated in relation to the body of the 3D avatar;
   generating, based on the indication of the animated body of the 3D avatar and the indication of the second object, a second set of point clouds representing the second object animated in relation to the body of the 3D avatar; compressing, using a set of compression algorithms, the first set of point clouds to obtain a compressed first set of point clouds and the second set of point clouds to obtain a compressed second set of point clouds; and transmitting the first set of compressed point clouds and the compressed second set of point clouds.

4. The method of claim 3, wherein the at least one processor comprises a first processor operatively connected to a second processor, the offline processing phase being executed by the first processor, and the online real-time processing phase being executed by the second processor.

5. The method of claim 1, wherein at least one of the first object and the second object comprises a soft body object.

6. The method of claim 1, wherein said outputting the respective final point cloud comprises smoothing points in the respective final point cloud, and outputting the smoothed points as the respective final point cloud.

7. The method of claim 1, further comprising: rendering the final point cloud with a corresponding frame of the second point cloud and of the animation of the 3D avatar to obtain a respective frame of the final animation of the 3D avatar with the first object and the second object, the first object interacting with the second object; and outputting, to display device operatively connected to the at least one processor, the respective frame of the final animation.

8. The method of claim 1, further comprising, prior to said rendering the final point cloud with the corresponding frame of the second point cloud and of the animation of the 3D avatar to obtain the respective frame of the final animation: calculating normals and tangents of the final points in the respective final point cloud; and wherein said rendering comprises using triangle rasterization based on the normal and tangents of the respective final point cloud with the corresponding frame of the second point cloud and of the animation of the 3D avatar to obtain the respective frame of the final animation.

9. The method of claim 1, wherein the set of constraints of the first object comprises distance constraints and bending constraints.

10. The method of claim 1, wherein the set of decompression algorithms comprises at least one of: a geometric encoder, a lossless data encoder and an artificial intelligence (AI) auto-encoder.

11. A system for performing a simulation of interactions of objects in relation to a 3D avatar in real-time, the system comprising:
a non-transitory storage medium storing computer-readable instructions thereon; and at least one processor operatively connected to the non-transitory storage medium, the at least one processor, upon executing the computer-readable instructions, being configured for:
during an online processing phase:
receiving an animation of a body of a 3D avatar, the animation comprising a set of frames, each frame representing a respective position of the body of the 3D avatar in time;
receiving a compressed first set of point clouds representing a first object animated in relation to the body of the 3D avatar, the compressed first set of point clouds having been generated and compressed offline; receiving a compressed second set of point clouds representing a second object animated in relation to the body of the 3D avatar, the second object being located on a layer above the first object, the compressed second set of point clouds having been generated and compressed offline;
decompressing, using the set of decompression algorithms, the first set of compressed point clouds to obtain a first set of point clouds, each respective first point cloud corresponding to a respective frame of the set of frames;
decompressing, using the set of decompression algorithms, the second set of compressed point clouds to obtain a second set of point clouds, each respective second point cloud corresponding to a respective frame of the set of frames; receiving a set of constraints associated with the first object; for each respective frame of the set of frames:
projecting the respective first point cloud onto the respective frame of the animation of the body of the 3D avatar to obtain a respective first projected point cloud; regrowing the first projected point cloud to obtain a regrown point cloud, said regrowing comprising, for each given projected point in the first projected point cloud: translating the given projected point in the respective first projected point cloud towards a corresponding given first point in the first point cloud; determining if the given translated projected point in the respective first projected point cloud intersects with the second point cloud;
if the given translated projected point intersects with the second point cloud: determining and adding a selected intersection point to the regrown point cloud; and if the given projected point does not intersect with the corresponding second given point: adding the corresponding given first point to the regrown point cloud;
solving, using the set of constraints associated with the first object, the respective regrown point cloud to obtain a final point cloud; and outputting the respective final point cloud, the respective final point cloud representing a respective frame of a final animation of the first object interacting with the second object on the body of the 3D avatar, the respective final point cloud to be rendered.

12. The system of claim 11, wherein the at least one processor is further configured for: rendering the respective final point cloud with the respective second point cloud and a respective frame of the animation of the body of the 3D avatar.

13. The system of claim 11, wherein the at least one processor is further configured for, prior to said receiving the animation of the body of the 3D avatar, during an offline processing phase: receiving the animation of a body of a 3D avatar, the animation comprising a set of frames, each frame representing a respective position of the body of the 3D avatar in time; receiving an indication of the first object to be animated in relation to the body of the 3D avatar;
receiving an indication of a second object to be animated in relation to the body of the 3D avatar; generating, based on the indication of the animated body of the 3D avatar and the indication of the first object, a first set of point clouds representing the first object animated in relation to the body of the 3D avatar;
generating, based on the indication of the animated body of the 3D avatar and the indication of the second object, a second set of point clouds representing the second object animated in relation to the body of the 3D avatar; compressing, using a set of compression algorithms, the first set of point clouds to obtain a compressed first set of point clouds and the second set of point clouds to obtain a compressed second set of point clouds; and transmitting the first set of compressed point clouds and the compressed second set of point clouds.

14. The system of claim 13, wherein the at least one processor comprises a first processor operatively connected to a second processor, the offline processing phase being executed by the first processor, and the online real-time processing phase being executed by the second processor.

15. The system of claim 11, wherein at least one of the first object and the second object comprises a soft body object.

16. The system of claim 11, wherein said outputting the final point cloud comprises smoothing points in the final point cloud, and outputting the smoothed points as the final point cloud.

17. The system of claim 11, wherein the at least one processor is further configured for:
- rendering the final point cloud with a corresponding frame of the second point cloud and of the animation of the 3D avatar to obtain a respective frame of the final animation of the 3D avatar with the first object and the second object, the first object interacting with the second object; and
- outputting, to display device operatively connected to the at least one processor, the respective frame of the final animation.

18. The system of claim 11, wherein the set of constraints of the first object comprises distance constraints and bending constraints.

19. A non-transitory storage medium comprising computer-readable instructions stored thereon for performing a simulation of interactions of objects in relation to a 3D avatar in real-time, the computer-readable instructions, upon being executed by at least one processor, cause the at least one processor to perform:
- during an online processing phase: receiving an animation of a body of a 3D avatar, the animation comprising a set of frames, each frame representing a respective position of the body of the 3D avatar in time; receiving a compressed first set of point clouds representing a first object animated in relation to the body of the 3D avatar, the compressed first set of point clouds having been generated and compressed offline;
- receiving a compressed second set of point clouds representing a second object animated in relation to the body of the 3D avatar, the second object being located on a layer above the first object, the compressed second set of point clouds having been generated and compressed offline;
- decompressing, using a set of decompression algorithms, the first set of compressed point clouds to obtain a first set of point clouds, each respective first point cloud corresponding to a respective frame of the set of frames; decompressing, using the set of decompression algorithms, the second set of compressed point clouds to obtain a second set of point clouds, each respective second point cloud corresponding to a respective frame of the set of frames; receiving a set of constraints associated with the first object;
- for each respective frame of the set of frames: projecting the respective first point cloud onto the respective frame of the animation of the body of the 3D avatar to obtain a respective first projected point cloud; regrowing the first projected point cloud to obtain a regrown point cloud, said regrowing comprising, for each given projected point in the first projected point cloud:
- translating the given projected point in the respective first projected point cloud towards a corresponding given first point in the first point cloud; determining if the given translated projected point in the respective first projected point cloud intersects with the second point cloud;
- if the given translated projected point intersects with the second point cloud: determining and adding a selected intersection point to the regrown point cloud; and if the given projected point does not intersect with the corresponding second given point:
- adding the corresponding given first point to the regrown point cloud; solving, using the set of constraints associated with the first object, the respective regrown point cloud to obtain a final point cloud; and outputting the respective final point cloud, the respective final point cloud representing a respective frame of a final animation of the first object interacting with the second object on the body of the 3D avatar, the respective final point cloud to be rendered.

20. The non-transitory storage medium of claim 19, further comprising computer-readable instructions that cause the at least one processor to perform, prior to said receiving the animation of the body of the 3D avatar, during an offline processing phase:
- receiving the animation of a body of a 3D avatar, the animation comprising a set of frames, each frame representing a respective position of the body of the 3D avatar in time; receiving an indication of the first object to be animated in relation to the body of the 3D avatar;
- receiving an indication of a second object to be animated in relation to the body of the 3D avatar; generating, based on the indication of the animated body of the 3D avatar and the indication of the first object, a first set of point clouds representing the first object animated in relation to the body of the 3D avatar;
- generating, based on the indication of the animated body of the 3D avatar and the indication of the second object, a second set of point clouds representing the second object animated in relation to the body of the 3D avatar; compressing, using a set of compression algorithms, the first set of point clouds to obtain a compressed first set of point clouds and the second set of point clouds to obtain a compressed second set of point clouds; and
- transmitting the first set of compressed point clouds and the compressed second set of point clouds.

* * * * *